United States Patent
Li et al.

(10) Patent No.: US 11,646,828 B2
(45) Date of Patent: May 9, 2023

(54) HARQ OF POLAR CODES WITH PARITY CHECK BITS

(71) Applicants: Qualcomm Incorporated, San Diego, CA (US); Jian Li, Beijing (CN); Changlong Xu, Beijing (CN); Jing Jiang, San Diego, CA (US); Kai Chen, Shenzhen (CN); Liangming Wu, Beijing (CN); Hao Xu, Beijing (CN)

(72) Inventors: Jian Li, Beijing (CN); Changlong Xu, Beijing (CN); Jing Jiang, San Diego, CA (US); Kai Chen, Shenzhen (CN); Liangming Wu, Beijing (CN); Hao Xu, Beijing (CN)

(73) Assignee: QUALCOMM INCORPORATED, San Diego, CA (US)

( * ) Notice: Subject to any disclaimer, the term of this patent is extended or adjusted under 35 U.S.C. 154(b) by 267 days.

(21) Appl. No.: 17/045,371

(22) PCT Filed: Apr. 4, 2019

(86) PCT No.: PCT/CN2019/081531
§ 371 (c)(1),
(2) Date: Oct. 5, 2020

(87) PCT Pub. No.: WO2019/201103
PCT Pub. Date: Oct. 24, 2019

(65) Prior Publication Data
US 2021/0152290 A1 May 20, 2021

(30) Foreign Application Priority Data
Apr. 20, 2018 (WO) ................ PCT/CN2018/083910

(51) Int. Cl.
*H04L 1/18* (2006.01)
*H04L 1/00* (2006.01)
*H04L 1/1812* (2023.01)

(52) U.S. Cl.
CPC .......... *H04L 1/1812* (2013.01); *H04L 1/0041* (2013.01); *H04L 1/0045* (2013.01);
(Continued)

(58) Field of Classification Search
CPC ... H04L 1/1812; H04L 1/0041; H04L 1/0067; H04L 1/0061; H04L 1/0045;
(Continued)

(56) References Cited

U.S. PATENT DOCUMENTS 11,031,955 B2 * 6/2021 Hui ........................ H04L 1/1845
2007/0220399 A1 9/2007 Kim et al.
(Continued)

FOREIGN PATENT DOCUMENTS

CN 103281166 A 9/2013
CN 106936548 A 7/2017
(Continued)

OTHER PUBLICATIONS

International Search Report and Written Opinion—PCT/CN2018/083910—ISA/EPO—dated Jan. 17, 2019 (182922W01).
(Continued)

*Primary Examiner* — Oussama Roudani
(74) *Attorney, Agent, or Firm* — Holland & Hart LLP

(57) ABSTRACT

Methods, systems, and devices for wireless communications are described. In some wireless communications systems, devices (e.g., base stations, user equipment (UEs), etc.) may utilize polar coding along with hybrid automatic repeat request (HARQ) techniques. In these systems, a device may encode bits for transmission by mapping information and parity check bits to a first set of polarized bit channels of a (Continued)

polar code. If this transmission is not successfully received at a decoding device, the encoding device may generate a HARQ retransmission. The device may copy information bits to a second set of polarized bit channels of a second polar code containing the first polar code and may assign parity check bits to the second set of bit channels for the copied information bits. These additional parity check bits for the repeated information bits may increase transmission reliability and may support improved early termination at the decoding device.

30 Claims, 17 Drawing Sheets

(52) U.S. Cl.
CPC .......... *H04L 1/0057* (2013.01); *H04L 1/0063* (2013.01); *H04L 1/0067* (2013.01)

(58) Field of Classification Search
CPC ... H04L 1/1819; H04L 1/0063; H04L 1/0057; H03M 13/13; H03M 13/6362; H03M 13/618
See application file for complete search history.

(56) References Cited

U.S. PATENT DOCUMENTS

| | | | |
|---|---|---|---|
| 2016/0204811 A1 | 7/2016 | Goela et al. | |
| 2020/0014405 A1* | 1/2020 | Wu | H03M 13/13 |
| 2020/0059253 A1* | 2/2020 | Chen | H03M 13/13 |
| 2020/0177206 A1* | 6/2020 | Chen | H03M 13/271 |

FOREIGN PATENT DOCUMENTS

| | | |
|---|---|---|
| CN | 107612561 A | 1/2018 |
| WO | WO-2017156792 A1 | 9/2017 |
| WO | WO-2017157027 | 9/2017 |
| WO | WO-2018031777 A1 | 2/2018 |

OTHER PUBLICATIONS

International Search Report and Written Opinion—PCT/CN2019/081531—ISA/EPO—dated Jul. 4, 2019 (182922WO2).
Huawei, et al., "IR-HARQ Scheme for Polar Codes," 3GPP Draft; R1-1700406, 3GPP TSG RAN WG1 NR Ad-Hoc Meeting, HARQ Scheme for Polar Codes, 3rd Generation Partnership Project (3GPP), Mobile Competence Centre, 650, Route Des Lucioles, F-06921 Sophia-Antipolis Cedex, France, vol. RAN WG1, No. Spokane, USA, Jan. 16, 2017-Jan. 20, 2017, Jan. 16, 2017, XP051207943, 4 pages, Retrieved from the Internet: URL: http://www.3gpp.org/ftp/Meetings_3GPP_SYNC/RAN1/Docs/ [retrieved on Jan. 16, 2017], pp. 1-3, figures 1-3.
Huawei, et al., "Details of the Polar Code Design", 3GPP TSG RAN WG1 Meeting #87, R1-1611254, Reno, USA, 3rd Generation, Partnership Project (3GPP), Mobile Competence Centre, 650, Route Des Lucioles, F-06921 Sophia-Antipolis Cedex, France, vol. RAN WG1, No. Reno, USA, Nov. 10, 2016-Nov. 14, 2016, 15 Pages, Nov. 13, 2016 (Nov. 13, 2016), XP051175235, Nov. 3, 2016, Retrieved from the Internet: URL: http://www.3gpp.org/ftp/Meetings_3GPP_SYNC/RAN1/Docs [retrieved on Nov. 13, 2016].
Huawei, et al., "HARQ Scheme for Polar Codes", 3GPP Draft, 3GPP TSG RAN WG1 Meeting #87, R1-1611255 HARQ Scheme for Polar Codes, 3rd Generation Partnership Project (3GPP), Mobile Competence Centre 650, Route Des Lucioles, F-06921 Sophia-Antipolis Cedex, France vol. RAN WG1, No. Reno, USA, Nov. 14, 2016-Nov. 18, 2016, Nov. 3, 2016 (Nov. 3, 2016), XP051189034, 25 Pages, Retrieved from the Internet: URL: http://www.3gpp.org/ftp/tsg_ran/WG1_1/TSGR1_87/Docs/[retrieved on Nov. 3, 2016] Sections 1 and 2.2.
Supplementary European Search Report—EP19789229—Search Authority—Munich—datead Dec. 6, 2021 (182922EP).

* cited by examiner

HARQ OF POLAR CODES WITH PARITY CHECK BITS

CROSS REFERENCES

The present Application for Patent claims priority to International Patent Application No. PCT/CN2019/081531 by Li, et al., entitled "HARQ OF POLAR CODES WITH PARITY CHECK BITS," filed Apr. 4, 2019; and to International Patent Application No. PCT/CN2018/083910 by Li, et al., entitled "HARQ OF POLAR CODES WITH PARITY CHECK BITS," filed Apr. 20, 2018, each of which is assigned to the assignee hereof and each of which is hereby incorporated by reference in its entirety.

BACKGROUND

The following relates generally to wireless communication, and more specifically to hybrid automatic repeat request (HARQ) processing of polar codes with parity check bits.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, wireless devices may utilize error-correcting codes (e.g., polar codes) for encoding transmissions. These devices may also implement HARQ techniques for detecting whether a decoding process is successful, transmitting an indication of a positive acknowledgement (ACK) or a negative acknowledgement (NACK) based on the result of the decoding process, and retransmitting a message if a NACK is received. In some systems (e.g., ultra-reliable low latency communications (URLLC) systems), the number of supported retransmissions may be limited based on a latency threshold or latency requirement associated with the wireless communications system.

SUMMARY

The described techniques relate to improved methods, systems, devices, or apparatuses that support hybrid automatic repeat request (HARQ) processing of polar codes with parity check bits. Generally, the described techniques provide for wireless devices (e.g., base stations, user equipment (UEs), etc.) to efficiently utilize HARQ techniques with polar coding. A device may encode bits for transmission by mapping information and parity check bits to a first set of polarized bit channels of a polar code of length N. The device may transmit the encoded bits, and the receiving device may attempt to decode the transmission. In some cases, the decoding operation may be unsuccessful, and the decoding device may transmit a negative acknowledgement (NACK) message to the encoding device. Based on this NACK, the encoding device may generate a HARQ retransmission. The device may copy information bits to a second set of polarized bit channels of a second polar code of length 2N, where the second polar code contains the second set of polarized bit channels and the first set of polarized bit channels of the first polar code. The device additionally may allocate parity check bits to the second set of bit channels for these copied information bits. The additional parity check bits in the second set of polarized bit channels may increase transmission reliability and improve early termination performance at the decoding device.

DETAILED DESCRIPTION

Figure 1:
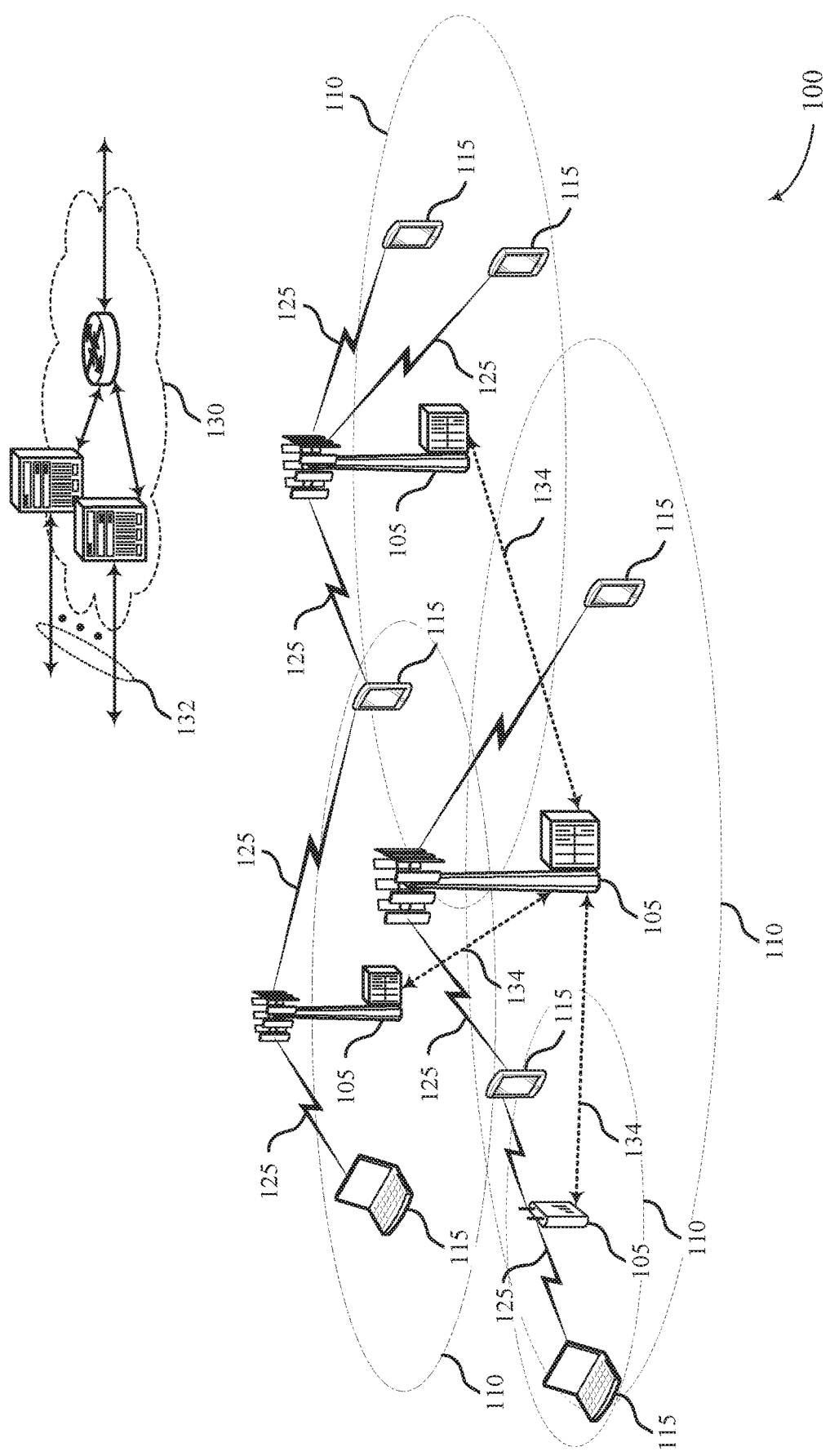
FIGS. 1 and 2 illustrate examples of wireless communications systems that support hybrid automatic repeat request (HARQ) of polar codes with parity check bits in accordance with aspects of the present disclosure.

In some wireless communications systems, base stations and user equipment (UEs) may encode or decode transmissions using an error-correcting code, such as a polar code. The wireless devices may additionally implement hybrid automatic repeat request (HARQ) procedures, transmitting positive acknowledgements (ACKs) or negative acknowledgements (NACKs) to indicate successful or unsuccessful decoding operations. If a device transmits a message, and receives a NACK in response, the device may retransmit additional information for the message based on the HARQ procedure. In some cases, the device may modify the retransmission to improve reliability of receiving and decoding the retransmitted message.

For example, the encoding device may transmit a first set of encoded bits generated based on mapping a set of information bits and a set of parity check bits to a first set of polarized bit channels of a first polar code, where the parity check bit values are calculated based on one or more of the information bits. The information bits and parity check bits may be positioned in bit channels with higher reliability metrics than bit channels containing frozen bits. In some cases, the encoding device may assign parity check bits to every bit channel not used for an information bit after the first information bit channel (i.e., the bit channel with the lowest index that contains an information bit). In other cases, the encoding device may assign a pre-determined or dynamic number of parity check bits to the bit channels and may assign frozen bits to the remaining bit channels (e.g., such that information, parity check, and/or frozen bits are interspersed in the bit channels). The device may then encode the information, parity check, and frozen bits using the polar code. The device may transmit this first set of encoded bits to a receiving wireless device.

If a decoding process of the receiving device fails, the encoding device may generate a second set of encoded bits for transmission. This second set of encoded bits may be based on a second polar code containing the first set of polarized bit channels and a second set of polarized bit channels. The first set of polarized bit channels may be configured identically to the first set of polarized bit channels in the first encoding process (e.g., with information, parity check, and frozen bits assigned to the same bit channels). However, the second polar code additionally includes the second set of polarized bit channels, and the encoding device may assign one or more repeated information bits in this second set of bit channels. The encoding device may also assign parity check bits to the second set of polarized bit channels, where the values of these parity check bits are based on the repeated information bits or on information bits in the first set of polarized bit channels (e.g., if information bits are not repeated in the second set of polarized bit channels). The encoding device may transmit this second set of encoded bits, and the receiving device may receive the transmission and perform a decoding process on the first set of encoded bits and this second set of encoded bits. By including the parity check bits in the second set of polarized bit channels, the encoding device may improve decoding performance, including reducing early termination latency at the decoding device.

Aspects of the disclosure are initially described in the context of wireless communications systems. Further aspects of the disclosure are described with reference to a device, bit mapping techniques, an encoding scheme, and a process flow. Aspects of the disclosure are further illustrated by and described with reference to apparatus diagrams, system diagrams, and flowcharts that relate to HARQ of polar codes with parity check bits.

FIG. 1 illustrates an example of a wireless communications system 100 that supports HARQ of polar codes with parity check bits in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that may make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that may support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator may be allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some wireless communications systems 100, base stations 105 and UEs 115 may encode or decode transmissions using an error-correcting code, such as a polar code. The wireless devices may additionally implement HARQ procedures, transmitting ACKs or NACKs to indicate successful or unsuccessful decoding operations. If a device transmits a message, and receives a NACK in response, the device may retransmit the message based on the HARQ procedure. In some cases, the device may modify the retransmission to improve reliability of receiving and decoding the retransmitted message.

For example, the encoding device may transmit a first set of encoded bits generated based on mapping a set of information bits and a set of parity check bits corresponding to the information bits to a first set of polarized bit channels of a first polar code. The information bits and parity check bits may be positioned in bit channels with higher reliability metrics than bit channels containing frozen bits. In some cases, the encoding device may assign parity check bits to every non-information bit channel after the first information bit channel (i.e., the bit channel with the lowest index that contains an information bit). The device may transmit the encoded bits (e.g., using a rate-matching procedure).

If a decoding process on this transmission fails, the encoding device may generate a second set of encoded bits for transmission. This second set of encoded bits may be based on a second polar code containing the first set of polarized bit channels and a second set of polarized bit channels. The first set of polarized bit channels may be configured identically to the first set of polarized bit channels in the first encoding process (e.g., with information, parity check, and frozen bits assigned to the same bit channels). However, the second polar code additionally may include the second set of polarized bit channels. In some cases, the encoding device may repeat one or more information bits in this second set of bit channels. The encoding device may assign parity check bits to the second set of polarized bit channels, where the values of these parity check bits may be based on the repeated information bits, information bits in the first set of polarized bit channels, or a combination thereof. The encoding device may transmit these encoded bits, and a decoding device may receive the transmission and perform a decoding process on the first set of encoded bits and this second set of encoded bits. Including the parity check bits in the second set of polarized bit channels may reduce early termination latency and, in some cases, may improve decoding path pruning at the decoding device.

Figure 2:
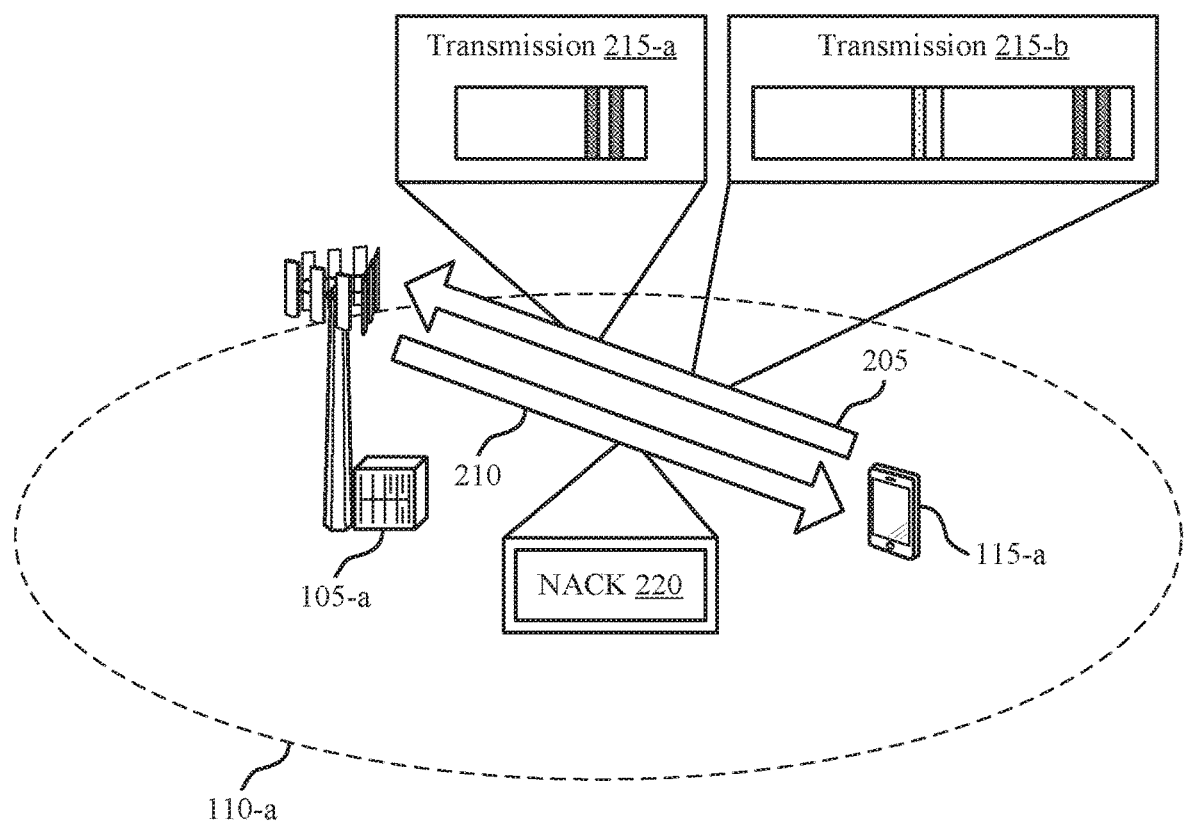

FIG. 2 illustrates an example of a wireless communications system 200 that supports HARQ of polar codes with parity check bits in accordance with aspects of the present disclosure. The wireless communications system 200 (e.g., an LTE ultra-reliable low latency communications (URLLC) system, an NR URLLC system, etc.) may include base station 105-*a* and UE 115-*a*, which may be examples of a base station 105 and a UE 115 as described with reference to FIG. 1. Base station 105-*a* may provide network coverage for geographic area 110-*a*. As illustrated, UE 115-*a* may act as an encoding device, and base station 105-*a* may act as a decoding device. However, it is to be understood that in some cases, base station 105-*a* may act as the encoding device and UE 115-*a* may act as the decoding device. In yet other cases, multiple base stations 105 or UEs 115 may communicate, where base stations 105 or UEs 115 may act as encoding devices, decoding devices, or both.

In the wireless communications system 200 (e.g., a URLLC system), wireless devices may utilize HARQ operations for error management. For example, if a wireless device receives a first transmission 215-*a* and fails to successfully decode the transmission 215-*a*, the wireless device may transmit an indication that the decoding operation failed. As illustrated, UE 115-*a* may transmit first transmission 215-a on the uplink 205 to base station 105-a at a first time, and base station 105-a may attempt to decode the first transmission 215-a. In some cases, the decoding operation at base station 105-a may be unsuccessful (e.g., due to poor channel quality, interference, signal corruption, etc.). In some cases, base station 105-a may determine that decoding failed based on parity check bits within first transmission 215-a. Alternatively, base station 105-a may determine that decoding failed based on other error check bits (e.g., CRC bits) within first transmission 215-a. Upon determining the decoding failure, base station 105-a may transmit a NACK 220 on the downlink 210 to UE 115-a indicating that the decoding operation failed. In other cases, base station 105-a may not receive first transmission 215-a, and correspondingly may not transmit the NACK 220. In these cases, UE 115-a may monitor for an ACK or NACK 220 from base station 105-a in response to the first transmission 215-a. If UE 115-a does not receive an ACK or NACK 220 within a certain response window, UE 115-a may determine that the first transmission 215-a is not successfully received at base station 105-a. In either case, UE 115-a may transmit second transmission 215-b to base station 105-a at a later time in a HARQ retransmission procedure (e.g., based on receiving the NACK 220 or based on not receiving an ACK or NACK 220 within a certain time frame).

In some cases, UE 115-a may perform multiple retransmissions for a same set of encoded bits. However, in certain wireless communications systems 200, latency requirements may indicate a maximum number of supported HARQ retransmissions (e.g., to meet a certain latency threshold or requirement). For example, in a URLLC system, wireless devices may perform a maximum of one retransmission to meet the low latency threshold (e.g., 1 ms) associated with the system. In such systems, HARQ operations may benefit from maximizing coding gain, supporting self-decodable transmissions, and including parity check bits in code construction.

UE 115-a and base station 105-a may implement an error-correcting code, such as a polar code, along with the HARQ operations. HARQ with incremental redundancy may be performed using polar codes by increasing the effective polar code length via retransmissions. For example, if first transmission 215-a is encoded using a polar code of length N, second transmission 215-b may include codeword bits that, when combined with the first transmission 215-a, represent a payload encoded using a polar code of length 2N. In these cases, both transmissions 215 may be effectively encoded using a same set of polarized bit channels of the polar code of length N. However, the retransmission (such as second transmission 215-b) may be encoded using an additional set of polarized bit channels. This additional set of polarized bit channels may include copied information bits from the first set of polarized bit channels used for first transmission 215-a. In addition or alternative to these copied information bits, the encoding device may include parity check bits (e.g., for these copied information bits, for other information bits, or for both) in the additional set of polarized bit channels. Including parity check bits in this additional set of polarized bit channels may improve reliability of the second transmission 215-b. In some cases, the parity check bits may support early termination, reducing the latency involved in determining whether a decoding operation for second transmission 215-b will fail. By increasing the reliability and reducing the early termination latency, introducing parity check bits in the additional set of polarized bit channels for a retransmission may improve the ability of a device to meet one or more latency thresholds or latency requirements associated with transmissions 215 in the wireless communications system 200.

In some cases, base station 105-a may receive the second transmission 215-b based on the HARQ retransmission process and may attempt to decode the second transmission 215-b and the first transmission 215-a together according to the polar code of length 2N. If base station 105-a again fails to decode the information bits from the second transmission 215-b, base station 105-a may transmit another NACK 220 to UE 115-a. However, if base station 105-a successfully decodes the second transmission 215-b (e.g., based on the additional information provided by jointly decoding the first and second transmissions 215, changing channel conditions, the greater polarity of a codeword generated using a length 2N polar code as opposed to a length N polar code, the redundancy of the copied bits and parity check bits, etc.), base station 105-a may transmit an ACK to UE 115-a indicating that the payload of the second transmission 215-b is successfully decoded at base station 105-a.

Figure 3:
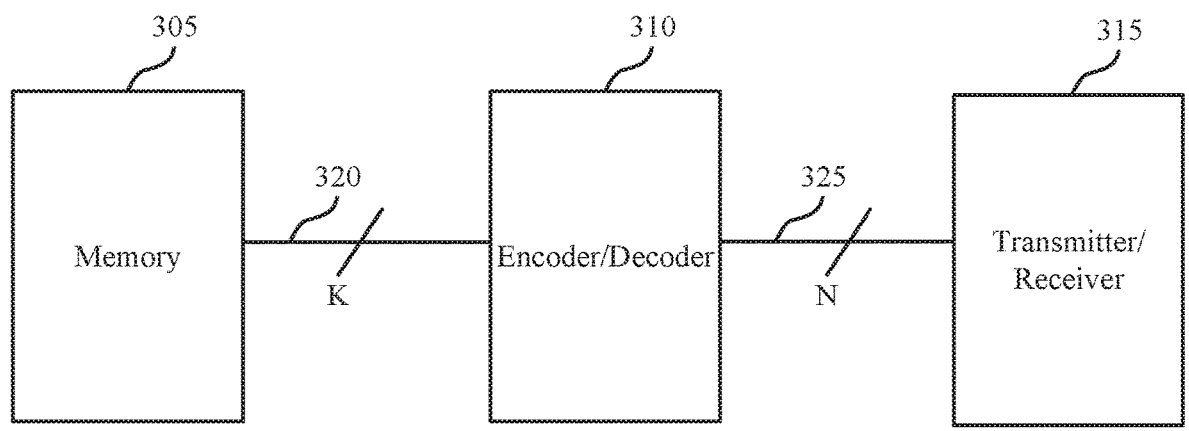
FIG. 3 illustrates an example of a device that supports HARQ of polar codes with parity check bits in accordance with aspects of the present disclosure.

FIG. 3 illustrates an example of a device 300 that supports HARQ of polar codes with parity check bits in accordance with aspects of the present disclosure. In some examples, device 300 may be implemented by aspects of wireless communication systems 100 or 200. The device 300 may be any device within a wireless communications system that performs an encoding or decoding process (e.g., using an error-correcting code, such as a polar code). For example, device 300 may be an example of a UE 115 or a base station 105 as described with reference to FIGS. 1 and 2.

As illustrated, device 300 may include a memory 305, an encoder/decoder 310, and a transmitter/receiver 315. First bus 320 may connect memory 305 to encoder/decoder 310 and second bus 325 may connect encoder/decoder 310 to transmitter/receiver 315. In some cases, device 300 may have data stored in memory 305 to be transmitted to another device, such as a UE 115 or base station 105. To initiate the transmission process, device 300 may retrieve from memory 305 the data for transmission. The data may include a number of payload bits, 'A,' which may be 1s or 0s, provided from memory 305 to encoder/decoder 310 via first bus 320. In some cases, these payload bits may be combined with a number of error checking bits (e.g., CRC bits), 'E,' to form a total set of information bits, 'A+E.' The number of information bits may be represented as a value 'K,' as shown (e.g., K=A+E). The encoder/decoder 310 may implement a polar code with a block length, 'N,' for encoding the information bits, where N may be different than or the same as K. Such a polar code may be referred to as an (N,K) polar code. In some cases, the bits that are not allocated as information bits (e.g., N−K bits) may be assigned as frozen bits or parity check bits. Parity check bits may be calculated based on one or more information bits K and may support early termination of a decoding process. The number of parity check bits may be represented as a value, 'P.'

In some cases, the transmitter 315 may transmit an encoded set of bits of length 'M' (e.g., where M is the number of coded bits after rate-matching). However, the encoding process may be performed using a polar code of length N, where N is a power of 2 (i.e., $N=2^m$ where m is an integer value). If M is not a power of 2, the encoder 310 may round the value of M up to the nearest valid N value (i.e., $N=2^{\lceil \log_2 M \rceil}$, such that M≤N). For example, if M=400, the encoder 310 may determine a codeword length of N=512 (e.g., the nearest valid value for N greater than or equal to M) in order to support polar coding. In these cases, the encoder 310 may encode a codeword of length N, and may puncture a number of bits N−M to obtain a codeword of the specified block length M for transmission. The encoder 310 may utilize a generator matrix, $G_N$, for a polar code of length N. For polar codes of length 2N (e.g., used for HARQ retransmissions, as discussed below), the encoder 310 may utilize a generator matrix $G_{2N}$, where $$G_{2N} = \begin{bmatrix} G_N & 0 \\ G_N & G_N \end{bmatrix}.$$

The encoder 310 may attempt to assign the information bits and the parity check bits to the K+P most reliable bit channels and the frozen bits to the remaining bit channels. In some cases, the information bits may be assigned to the K most reliable bit channels, and the parity check bits may be assigned to the P next most reliable bit channels. The encoder/decoder 310 may employ various techniques for determining the K or K+P most (or an estimation of the most) reliable bit channels. For example, the encoder/decoder 310 may implement fractal enhanced kernel (FRANK) polar code construction, polarization-weight (PW), generator weight (GW), density evolution (DE), or a combination of these techniques. In some cases, the encoder/decoder 310 may employ look-up-tables that provide bit-channel reliability based on various combinations of N, M, and K. The encoder 310 may determine information bit channels and parity check bit channels based on the determined bit-channel reliability and may assign frozen bits to the remaining bit channels. Frozen bits may be bits of a default value (e.g., 0, 1, etc.) known to both the encoder and decoder (i.e., the encoder encoding information bits at a transmitter and the decoder decoding the codeword received at a receiver). Furthermore, from the receiving device perspective, device 300 may receive a data signal representing the codeword via receiver 315 and may decode the signal using decoder 310 to obtain the transmitted data.

In some wireless systems, decoder 310 may be an example of a successive cancellation (SC) or a successive cancellation list (SCL) decoder. A UE 115 or base station 105 may receive a transmission including a codeword (e.g., symbol information representing the unpunctured bits of the codeword) at receiver 315 and may send the transmission to the SCL decoder (e.g., decoder 310). The SCL decoder may determine input logarithmic-likelihood ratios (LLRs) for the bit channels of the received codeword. During decoding, the SCL decoder may determine decoded LLRs based on these input LLRs, where the decoded LLRs correspond to each bit channel of the polar code. These decoded LLRs may be referred to as bit metrics. In some cases, if the LLR is zero or a positive value, the SCL decoder may determine the corresponding bit is a 0 bit, and a negative LLR may correspond to a 1 bit. The SCL decoder may use the bit metrics to determine the decoded bit values.

The SCL decoder may employ multiple concurrent SC decoding processes. Each SC decoding process may decode the codeword sequentially (e.g., in order of the bit channel indices, in the U-domain). Due to the combination of multiple SC decoding processes, the SCL decoder may calculate multiple decoding path candidates. For example, an SCL decoder of list size 'L' (i.e., the SCL decoder has L SC decoding processes) may calculate L decoding path candidates and a corresponding reliability metric (e.g., a path metric) for each decoding path candidate. The path metric may represent a reliability of a decoding path candidate or a probability that the corresponding decoding path candidate is the correct set of decoded bits. The path metric may be based on the determined bit metrics and the bit values selected at each bit channel. The SCL decoder may have a number of levels equal to the number of bit channels in the received codeword. At each level, each decoding path candidate may select either a 0 bit or a 1 bit based on a path metric of the 0 bit and the 1 bit. The SCL decoder may select a decoding path candidate based on the path metrics and may output the bits corresponding to the selected decoding path as the decoded sets of bits. For example, the SCL decoder may select the decoding paths with the highest path metrics for error checking and may determine a successfully decoded path candidate based on a result of the error checking process.

If an SCL decoder determines that the first number of bits are all frozen bits, the SCL decoder may determine that the correct decoding path for the first number of bits must be the default frozen bit values (e.g., if the default frozen bit value is 0, the correct decoding path for the first number of bits must be all 0's). Once the SCL decoder reaches the first information bit, the SCL decoder may begin performing operations to decode the rest of the bits of the codeword, as the SCL decoder may not be able to determine the correct decoding path from the first information bit onwards (e.g., because the first information bit may be a 0 or a 1). However, the SCL decoder may still determine bit metrics for the bit channels containing frozen bits and may use these bit metrics when calculating path metrics for the decoding path candidates. For example, the SCL decoder may update the path metric for the decoding candidates after every bit, regardless of bit type (e.g., after each frozen bit, payload bit, parity check bit, etc.).

Transmitting devices and receiving devices, such as base stations 105 and UEs 115, may use polar coding to increase the reliability of a communications link. The transmitting devices and receiving devices may also use HARQ operations to increase the reliability of a communications link. HARQ operation may include retransmitting (at least partially) encoded information for the information bits one or more times, allowing a receiving device to perform successive decoding operations. Each decoding operation may provide the receiving device with additional information for decoding and increase the likelihood of a successful decoding of the encoded information.

In some examples, transmitting devices and receiving devices may use polar coding in combination with HARQ operation to further increase the reliability of a communications link. As discussed above, polar codes approach the theoretical channel capacity as the code length increases, and each retransmission for a HARQ operation may effectively increase the code length (e.g., reduce the effective code rate) of a data transmission, or provide additional information for decoding the data transmission. For example, a first transmission may be associated with a first codeword of a first size N. A first retransmission may be associated with a second codeword of a second size 2N. Further retransmissions may utilize different size codewords or may include additional information for decoding the first transmission. Thus, the likelihood of decoding each successive codeword may increase.

As described herein, each sub-channel, or polarized bit-channel, of a polar code may be associated with a reliability, and the reliability of some sub-channels may be higher than others. In the context of HARQ operation, the combined information for the first transmission and retransmission may effectively increase the length of the polar code (e.g., 2N, as opposed to N), which may increase the polarity of the bit channels of the longer polar code. For example, some of the bit channels in the length N polar code that have the highest reliability for the length N polar code, may have lower reliability than some additional bit channels for the length 2N polar code. In some cases, the reliabilities are based on channel conditions and/or transmission parameters. The reliabilities of some of the second sub-channels may be improved relative to the first reliabilities of the first sub-channels, and the relative reliabilities may vary if channel conditions change or if different transmission parameters (e.g., different modulation) are used for the first retransmission.

In some cases, a transmitting device may copy one or more information bits used to generate the first codeword to the second sub-channels. In some cases, the copied information bits may be payload bits. The transmitting device may additionally or alternatively introduce one or more parity check bits to the second sub-channels, where these parity check bits may be based on the copied information bits or other information bits. In this way, both the first sub-channels and the second sub-channels may include payload bits and parity check bits. A bit mapping technique implemented for the parity check bits in the second sub-channels may match a bit mapping technique used for the parity check bits in the first sub-channels. For example, a number of parity check bits in the second sub-channels or a positioning of parity check bits in the second sub-channels may be determined using a same formula or calculation as used for parity check bits in the first sub-channels.

Figure 4A:
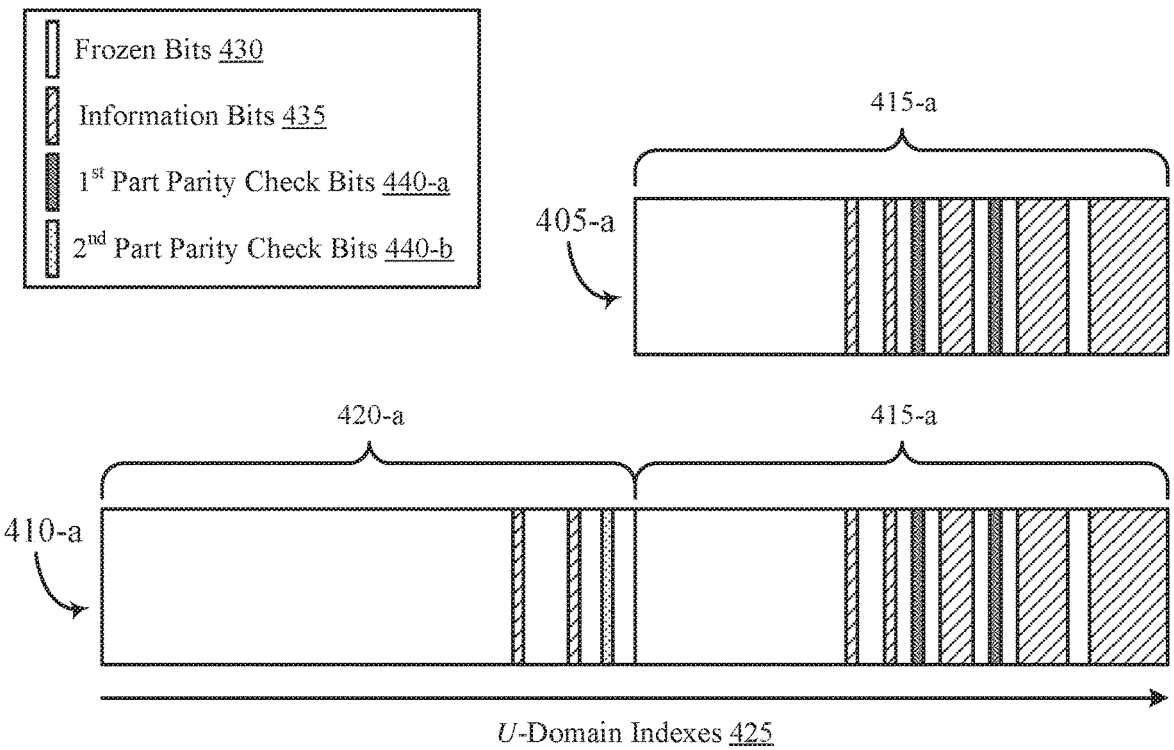
FIGS. 4A and 4B illustrate examples of bit mapping techniques that support HARQ of polar codes with parity check bits in accordance with aspects of the present disclosure.
Figure 4B:
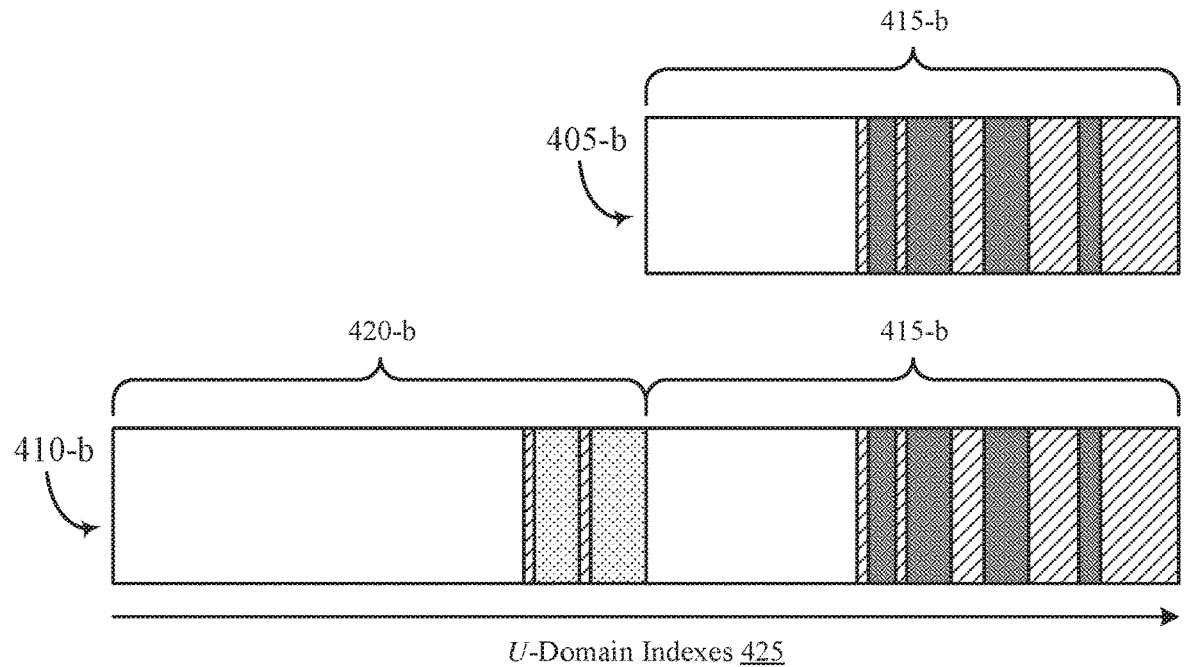

FIGS. 4A and 4B illustrate examples of bit mapping techniques 400 that support HARQ of polar codes with parity check bits in accordance with aspects of the present disclosure. FIG. 4A illustrates an example bit mapping technique 400-$a$ utilizing a sparse number of parity check bits 440. For example, the bit mapping technique 400 may use a pre-determined or configured number of parity check bits 440 in a bit vector 415 or 420. The bit mapping technique 400-$a$ may include U-domain bit mapping for a first transmission 405-$a$ and U-domain bit mapping for a retransmission 410-$a$ of the first transmission. The bit mapping is illustrated in the U-domain, with the U-domain indexes 425 increasing from left to right. Correspondingly, decoding of these bits is also performed from left to right.

U-domain bit mapping for the first transmission 405-$a$ includes mapping of information bits 435—which, in some cases, may be referred to as payload bits—and parity check bits 440 to the U-domain. The U-domain may correspond to the unencoded bit channels, where the U-domain defines the order in which the bits are decoded in an SC decoding procedure. The U-domain bit channels may be polarized, meaning the reliability may be different between bit channels. In contrast, the encoded bit channels may be referred to as the X-domain, and may have the same inherent channel reliability (e.g., unpolarized bit channels). In some cases, the information bits 435 and parity check bits 440 may be allocated to relatively higher reliability bit channels, and the remaining lower reliability bit channels may be assigned frozen bits 430. In one example, the transmitting device may encode K information bits 435 and P parity check bits 440 into the codeword. The encoder may assign the K information bits 435 to the K most reliable bit channels (e.g., based on PW, GW, DE, and/or FRANK channel reliability estimations), the P parity check bits 440 to the P next-most reliable bit channels, and the N−(K+P) frozen bits to the remaining bit channels of the bit vector 415-$a$. The resulting bit vector 415-$a$ may be referred to as the A vector. The encoder may polar encode this bit vector 415-$a$ of length N using a generator matrix, $G_N$, to determine a codeword $X_1$ (e.g., where $X_1 = AG_N$). The encoder or transmitter may then perform rate-matching on $X_1$ (e.g., using bit puncturing) and may transmit the resulting codeword.

In bit mapping technique 400-$a$, the device may determine a number of parity check bits 440, P, to utilize based on the number of information bits 435, K, based on the length of the polar code, N (e.g., a number of bit channels in the set of polarized bit channels), based on the length of the transmission, M, based on a pre-determined value or threshold (e.g., 3 bits), or based on some combination of these parameters. In some cases, each parity check bit 440 may be determined based on one or more of the information bits 435 preceding it in the bit vector 415-$a$. In this way, during a decoding process, a decoder may determine which decoding paths pass a parity check upon decoding each parity check bit 440. In other cases, the parity check bits 440 may be based on any information bits 435 within the bit vector 415-$a$. For example, a parity check bit 440 may precede an information bit 435 on which the parity check bit 440 is based (e.g., in order to position the information bits 435 in higher reliability bit channels than the parity check bits 440). In these cases, the decoder may not perform the parity check when determining a value for the parity check bit 440 and may instead perform the parity check upon decoding the information bit 435 with the greatest bit channel index that the parity check bit 440 is based on. In other cases, there may not be any parity check bits 440 in bit vector 415-$a$. For example, it may be the case that bit vector 415-$a$ consists of a combination of frozen bits 430 and information bits 435.

If the first transmission is not successfully decoded by the decoding device, the encoding device may encode a second set of U-domain bits for retransmission. The second set of bits may include bit vector 415-$a$ (e.g., the same bit vector, A, as the U-domain bit mapping for the first transmission 405-$a$) and may additionally include a second bit vector 420-$a$ (i.e., bit vector B), which may precede bit vector 415-$a$ in U-domain indexing order. Bit vectors 415-$a$ and 420-$a$ may share a same length, N, resulting in a total bit vector and polar code of length 2N. The second portion of this bit vector (e.g., containing the N bit channels with the N greatest bit channel indexes) may be identical to the bit vector 415-$a$ of the U-domain bit mapping for the first transmission 405-$a$ (e.g., the same number and locations of information bits 435, first part parity check bits 440-$a$, and frozen bits 430). The additional part of this bit vector (i.e., bit vector 420-$a$) may include one or more copied information bits 435 from the bit vector 415-$a$, one or more second part parity check bits 440-$b$, or a combination thereof. The encoder may polar encode both the bit vector 415-$a$ from the U-domain bit mapping for first transmission 405-$a$ and the total bit vector of length 2N for the U-domain bit mapping for retransmission 410-$a$ using a generator matrix, $G_{2N}$, to determine values for both $X_1$ (e.g., the same as calculated before) and $X_2$. For example, $$X' = [X_1, X_2] = [B, A]\begin{bmatrix} G_N & 0 \\ G_N & G_N \end{bmatrix},$$

resulting in the codeword $X_1$ and a codeword $X_2$ (e.g., where $X_2 = BG_N + AG_N$). The encoder or transmitter may then perform rate-matching on $X_2$ and may transmit the resulting codeword.

The number of copied information bits 435 (e.g., from bit vector 415-a to bit vector 420-a) may be based on the values of K, N, M, a pre-determined value, or some combination of these parameters. In some cases, the encoder may copy information bits 435 located at the lowest reliability bit channels of the bit channels containing information bits 435 in bit vector 415-a. These copied information bits 435 may be allocated to bit channels in the bit vector 420-a with higher reliability values than the bit channels containing these bits in bit vector 415-a. This may improve the reliability of successfully decoding these copied information bits 435. In other cases, the encoder may select the information bits 435 to copy into bit vector 420-a based on different criteria (e.g., based on decoding order to reduce the latency in early termination procedures, based on priority values, etc.).

To provide error correction for the copied information bits 435, the encoder may additionally or alternatively include one or more second part parity check bits 440-b in the additional bit vector 420-a. These second part parity check bits 440-b may be calculated based on the copied information bits 435 in the additional bit vector 420-a. In some cases, the second part parity check bits 440-b may be determined based on the copied information bits 435 preceding them in the decoding order. In other cases, the second part parity check bits 440-b may be determined based on any copied information bits 435 in the additional bit vector 420-a, regardless of decoding order or U-domain index 425. In yet other cases, the second part parity check bits 440-b may be determined based on information bits 435 in the bit vector 415-a (e.g., if no information bits 435 are copied into the additional bit vector 420-a).

The number or position of the second part parity check bits 440-b may be based on the number of information bits 435, K, the number of copied information bits, the number of first part parity check bits 440-a, the length of the polar code, N, the length of the transmission, M, a pre-determined value (e.g., 3 bits), bit channel reliability information for the bit vector 420-a, or some combination of these parameters. In a first example, the number of copied information bits 435 and the number of second part parity check bits 440-b may be configured as constant values. For example, the additional bit vector 420-a may include three copied information bits 435 and two second part parity check bits 440-b. In these cases, which information bits 435 are copied, where these copied information bits 435 are positioned in bit vector 420-a, where the parity check bits 440-b are positioned, and which information bits 435 (e.g., copied or otherwise) are used to calculate each parity check bit 440-b may differ based on different configurations or constraints. In one possible example, the three information bits 435 positioned in the least reliable information bit channels of bit vector 415-a may be copied over to bit vector 420-a, and may be positioned in the three most reliable bit channels of bit vector 420-a. These reliabilities may be determined or estimated based on PW, GW, DE, and/or FRANK channel reliability estimations, or based on a lookup table according to values for N, K, M, etc. The copied information bits 435 may be positioned such that the bit in the least reliable information bit channel of bit vector 415-a is positioned in the most reliable bit channel of bit vector 420-a, such that the information bits 435 in the first, second, and third least reliable information bit channels in bit vector 415-a are positioned in the third, second, and first most reliable bit channels of bit vector 420-a, respectively, or positioned to maintain decoding order between bit vector 415-a and 420-a. The second part parity check bits 440-b may be positioned according to similar or different rules. In some cases, the copied information bits 435, second part parity check bits 440-b, or both may be positioned in bit channels within bit vector 420-a to support a self-decodable codeword.

In a second example, an encoding device may compare bit channel reliabilities between bit vectors 415-a and 420-a to determine the number and/or positioning of copied information bits 435. For example, information bits 435 may be copied from bit channels in bit vector 415-a to bit channels in bit vector 420-a with relatively higher reliability values. In some cases, the information bit 435 in the bit channel with the lowest bit channel reliability in bit vector 415-a may be copied to the bit channel with the highest bit channel reliability in additional bit vector 420-a. Alternatively, this information bit 435 may be copied to the bit channel in bit vector 420-a with a lowest bit channel reliability that is still greater than the bit channel reliability for the information bit 435 location in bit vector 415-a. In some cases, the positioning of the copied information bits 435 may be based on the positioning of the second part parity check bits 440-b. For example, the copied information bits 435 and corresponding parity check bits 440-b may be staggered in bit channels such that each copied information bit 435 is followed by a parity check bit 440-b before a bit channel with another copied information bit 435.

In some cases, the number and positioning of copied information bits 435, second part parity check bits 440-b, or both may be based on values in a lookup table. For example, the number and positioning may be based on values of K, N, M, the number of first part parity check bits 440-a, etc.

By including second part parity check bits 440-b in bit vector 420-a of the U-domain bit mapping for the retransmission 410-a, a decoding device may determine whether one or more of the copied information bits 435 in bit vector 420-a pass a parity check. This may result in reduced latency of early termination during unsuccessful decodes and/or supports a higher reliability of successfully decoding the retransmission. This may be especially useful in low latency wireless systems.

FIG. 4B illustrates an example bit mapping technique 400-b utilizing multiple parity check bits 440 following the first information bit 435 in each bit vector 415 or 420. The bit mapping technique 400-b may be very similar to bit mapping technique 400-a, except that the encoding device implementing bit mapping technique 400-b may replace a larger number of frozen bits 430 with parity check bits 440. For example, in U-domain bit maps for the first transmission 405-b, the retransmission 410-b, or both, the encoding device may allocate parity check bits 440 to each bit channel not containing an information bit 435 following the first information bit 435 in a bit vector 415 or 420. For example, for bit vector 415-b, once decoding reaches a first information bit 435, a decoding device may perform parity checks based on this first information bit 435. To improve the reliability of parity checks, rather than include frozen bits 430 at certain (e.g., sparse) bit channels with indexes greater than this first information bit 435, the encoding device may include parity check bits 440 at each of these bit channels (e.g., the bit channels not allocated for other information bits 435).

This introduces redundancy to the parity checks, helping reduce the likelihood that a decoding path with poor bit or path metrics may pass a parity check (e.g., due to a false positive result of the parity check). This parity check redundancy may improve the early termination process (e.g., reducing the latency and terminating more decoding paths corresponding to input codewords that are unlikely to be successfully decoded). In some cases, parity check bits 440 that are calculated based on the same information bits 435 may have the same value. In other cases, parity check bits 440 calculated based on the same information bits 435 may have different values (e.g., based on other inputs to the parity calculations, such as bit channel index). In one example, an encoding device may utilize a linear-feedback shift register (LFSR) to calculate the parity check bit values. For example, the LFSR may receive one or more information bits 435 as input and may output parity check bit values. The LFSR may be incremented at each successive bit channel index, resulting in parity check bit values that are dependent on the shifting LFSR and the input information bits 435. Bit vector 415-*b* and bit vector 420-*b* may both implement this same bit mapping technique 400-*b* supporting redundant parity check bits 440, or the bit vectors 415 and 420 may implement different bit mapping techniques 400.

In one specific example, as discussed above with respect to bit mapping technique 400-*a*, one or more parity check bits 440 in bit mapping technique 400-*b* may precede information bits 435 that the parity check bits 440 are based on. In such an example, the encoding device may determine the locations for the parity check bits 440 based on one or more parameters. For example, parity check bits 440 may be assigned to all bit channels with bit channel reliabilities greater than a reliability threshold. In another example, parity check bits 440 may be assigned to all bit channels with bit channel indexes greater than the bit channel index of a bit channel with a reliability greater than a reliability threshold. In yet another example, the encoding device may utilize a pre-determined or dynamic number of parity check bits 440 and may identify a number of bit channels to support this number of parity check bits 440. The encoding device may remove bit channels used for information bits 435 and may allocate the parity check bits 440 to the remaining bit channels with the greatest bit channel indexes or greatest bit channel reliabilities. In other cases, there may not be any parity check bits 440 in bit vector 415-*b*, 420-*b*, or both. Additionally or alternatively, there may not be any information bits 435 in bit vector 420-*b*, and the second part parity check bits 440-*b* may indicate values for one or more information bits in bit vector 415-*b*.

Figure 5:
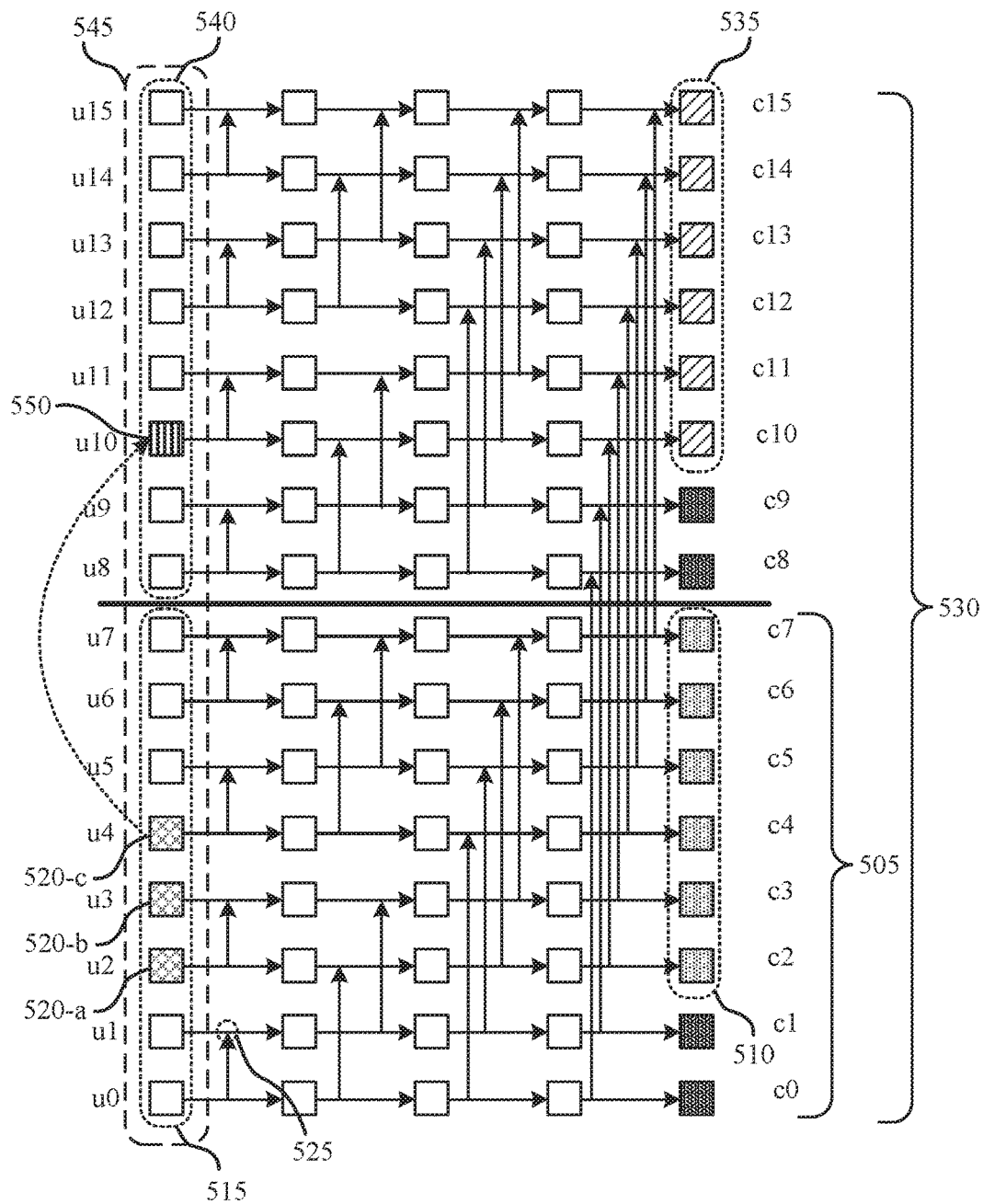
FIG. 5 illustrates an example of an encoding scheme that supports HARQ of polar codes with parity check bits in accordance with aspects of the present disclosure.

FIG. 5 illustrates an example of an encoding scheme 500 that supports HARQ of polar codes with parity check bits in accordance with aspects of the present disclosure. Encoding scheme 500 may illustrate aspects of a transmission between a UE 115 and a base station 105, as described herein with reference to FIGS. 1 and 2. Encoding scheme 500 may include first codeword 505 and second codeword 530. First codeword 505 may be composed of first encoded bits 510, which may be generated using first polarized bit channels 515, information bits 520-*a*, 520-*b*, and 520-*c*, and exclusive or (XOR) operations 525. Second codeword 530 may be composed of first encoded bits 510 and second encoded bits 535, which may be generated using second polarized bit channels 540, XOR operations 525, first encoded bits 510, and copied information bit 550. In some cases, second codeword 530 may be considered as being generated using combined polarized bit channels 545 of a second polar code of length 2N, which includes both first polarized bit channels 515 and second polarized bit channels 540.

A transmitting device may encode information bits 520-*a* to 520-*c* to obtain first encoded bits 510 using a polar code of size N and may prepare a retransmission of second encoded bits 535 using a second polar code of effective size 2N and first encoded bits 510. As shown, transmitting device may use a block length of M=6, so the transmitting device may round up to generate the first codeword 505 of size N=8, and puncture two bits of the encoded bits 510 (i.e., corresponding to punctured bits 555) to generate a codeword of the block length M.

The transmitting device may generate the first codeword 505, including the first encoded bits 510 and punctured bits 555, by identifying the K most reliable bit channels of the N bit channels in the first polarized bit channels 515. As shown, K=3, M=6, and N=8 in this example. In some examples, information bit allocation may be determined based on PW, GW, DE, and/or FRANK channel reliability estimation. In some cases, information bits 520-*a*, 520-*b*, and 520-*c* are mapped to the most reliable bit channels of the first polarized bit channels 515 (e.g., bit channels 3, 4, and 5, respectively). The K bit channels selected for information bits of the first polarized bit channels 515 may be referred to as a first set of bit channels, D. As described, D={$i_0$, $i_1$, . . . , $i_{K-1}$}, $0 \ge i_j < N$ are the indices set of the information bits in the U-domain, where the corresponding payloads are denoted as {$u_0$, $u_1$, . . . , $u_{K-1}$}. In the U-domain, $u_8$=[0, 0, 0, $u_0$, $u_1$, $u_2$, 0, 0], where $u_8$ corresponds to the 8 bit channels in the first polarized bit channels 515, showing that information bits are on bit channels 3, 4, and 5. The transmitting device may generate the first codeword 505 of size N=8 and puncture two bits to generate a codeword of length M=6. The first codeword 505 may be referred to as $C_1$. The transmitting device may generate the first codeword 505 according to a generator matrix, G, where $C_1$=uG. The transmitting device may then transmit the first six bits of $C_1$ (e.g., corresponding to M, the block length) to a receiving device.

The receiving device may not successfully decode the first encoded bits 510. In some cases, the receiving device may indicate the failure (e.g., in a NACK) to the transmitting device. In some other examples, the transmitting device may not receive feedback for the first encoded bits 510, as they were not successfully received by the receiving device (e.g., due to interference, etc.). The transmitting device may transmit the second encoded bits 535 to the receiving device in a retransmission. The receiving device may receive second encoded bits 535 and may combine second encoded bits 535 with first encoded bits 510 to create second codeword 530. The receiving device may have a higher likelihood of decoding second codeword 530, because each received bit in a polar coded transmission may provide additional information for decoding another bit.

In some cases, the one or more bit channels within second polarized bit channels 540 for the copied information bits 550 may be determined based on a reliability comparison (e.g., the number of bit-channels within the second polarized bit channels 540 that have greater reliabilities than at least one bit-channel within the first polarized bit-channels, as determined based on the second polar code). However, other techniques may be used such as a progressive matching (e.g., progressively matching bit-channels within the second polarized bit channels 540 in decreasing order of reliability with bit-channels having a lowest reliability, or a highest reliability lower than the progressively matched bit-channel, in some cases), or self-decodable redundancy version bit copying. Additionally or alternatively, the determination may be based on a difference between the updated channel condition metric and a previous channel condition metric (e.g., a channel condition metric determined prior to transmission of the first codeword 505).

The information bits 520—and, correspondingly, the copied information bit 550—may indicate payload information.

In some cases, the transmitting device may additionally encode parity check bits, which may indicate information about the information bits 520 or copied information bit 550. For example, the parity check bit values may be examples of repeated information bit values, or the parity check bit values may be calculated based on one or more information bit values, bit channel indexes, or some combination of these values. The transmitting device may include parity check bits in both the first polarized bit channels 515 (e.g., containing parity check information related to one or more of the information bits 520, the copied information bit 550, or both) and the second polarized bit channels 540 (e.g., containing parity check information related to the copied information bit 550).

Figure 6:
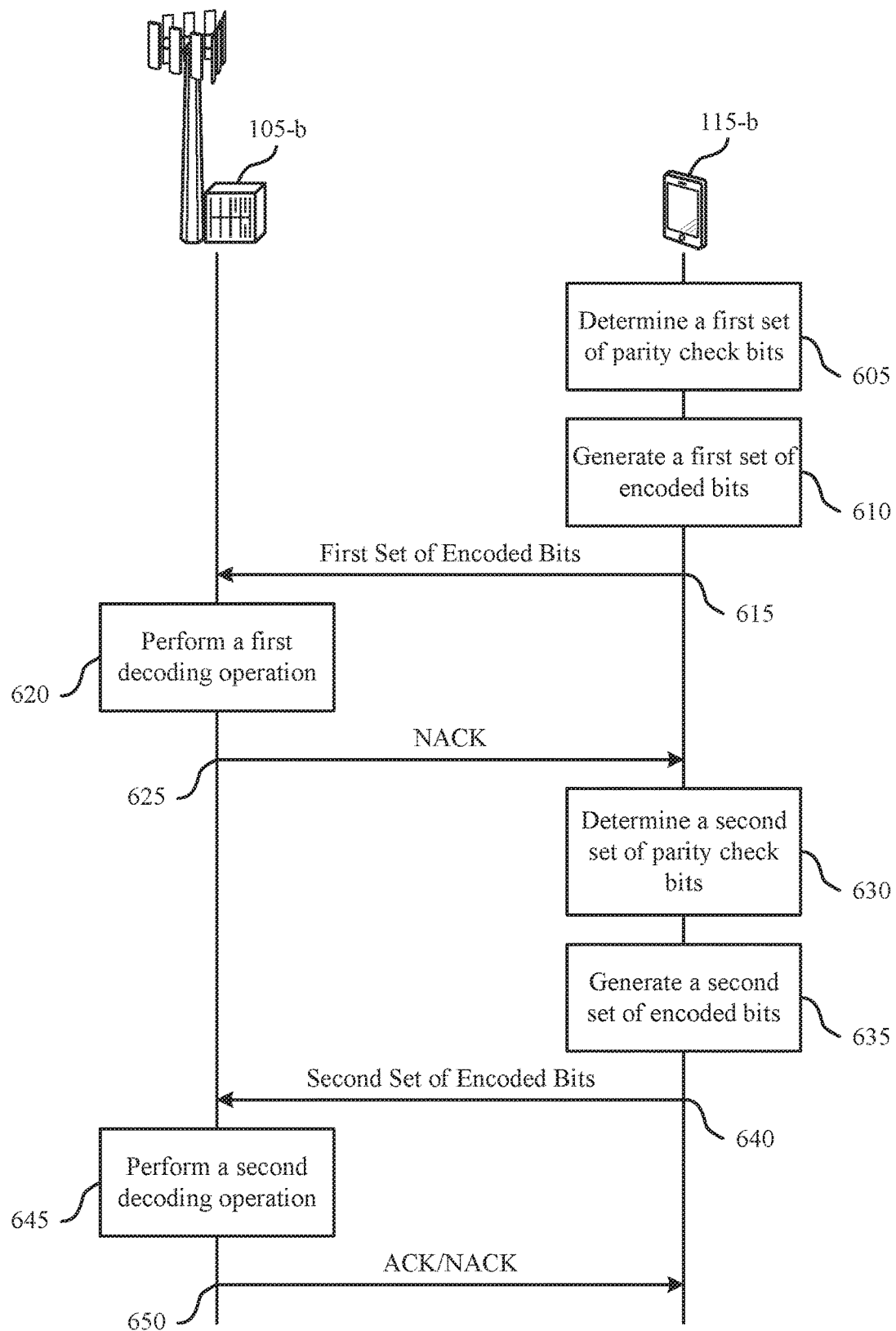
FIG. 6 illustrates an example of a process flow that supports HARQ of polar codes with parity check bits in accordance with aspects of the present disclosure.

FIG. 6 illustrates an example of a process flow 600 that supports HARQ of polar codes with parity check bits in accordance with aspects of the present disclosure. Process flow 600 may include base station 105-b and UE 115-b, which may be examples of the corresponding devices described with reference to FIGS. 1 and 2. As illustrated, UE 115-b may generate codewords for transmission to base station 105-b, and base station 105-b may attempt to decode the codewords. However, it is to be understood that either UE 115-b or base station 105-b may perform the encoding processes described herein and either may perform the decoding processes described herein. In some implementations, the processes described herein may be performed in a different order, or may include one or more additional or alternative processes performed by the wireless devices.

At 605, an encoding device (e.g., UE 115-b) may determine a first set of parity check bits based on an information bit vector. At 610, the encoding device may generate a first set of encoded bits for transmission. The encoding device may map the information vector to a first set of polarized bit channels of a first polar code according to a first bit index set and may map the first set of parity check bits to other bit channels of the first set of polarized bit channels.

At 615, the encoding device (e.g., UE 115-b) may transmit the first set of encoded bits to a device (e.g., a decoding device, such as base station 105-b) over a wireless channel. In some cases, the encoding device may perform rate-matching on the first set of encoded bits prior to the transmission. The decoding device may receive the first set of encoded bits over the channel.

At 620, the decoding device (e.g., base station 105-b) may perform a first decoding operation on the first set of encoded bits according to the first polar code to obtain a first representation of the information bit vector determined from the first set of polarized bit channels of the first polar code according to the first bit index set and the first set of parity check bits for the information bit vector. In some cases, this first decoding operation may be unsuccessful (e.g., based on poor channel conditions, interference, etc.).

At 625, the decoding device may transmit, to the encoding device, an indication that the first decoding operation was unsuccessful. This indication may be an example of a NACK. The encoding device (e.g., UE 115-b) may receive the NACK and may determine to retransmit the encoded information bit vector based on the HARQ operation.

At 630, the encoding device may determine a second set of parity check bits based on at least one bit of the information bit vector (e.g., where the at least one bit of the information bit vector may be repeated in a second set of polarized bit channels). In some cases, the number of bits or the specific bit channels for the second set of parity check bits may be based on one or more of a number of bits in the information bit vector, a number of bit channels in the first set of polarized bit channels, a number of bits of the at least one repeated bit of the information bit vector (e.g., the number of copied information bits), a number of bits of the first set of parity check bits, or bit channel reliability information for the first and second sets of polarized bit channels.

At 635, the encoding device may generate a second set of encoded bits for retransmission of the information bit vector. For example, the encoding device may map the second set of parity check bits to bit channels of the second set of polarized bit channels of a second polar code. In some cases, the encoding device may additionally map a repetition of the at least one bit of the information bit vector for repetition to the second set of polarized bit channels of the second polar code according to a second bit index set, where the second set of parity check bits are mapped to other bit channels of the second set of polarized bit channels. The second polar code used for generating the second set of encoded bits may be a superset of the first polar code used for generating the first set of encoded bits.

At 640, the encoding device (e.g., UE 115-b) may transmit the second set of encoded bits to the decoding device (e.g., base station 105-b) over the wireless channel. The decoding device may receive the second set of encoded bits and may perform a second decoding operation at 645. For example, the decoding device may perform the second decoding operation on both the first set of encoded bits (e.g., received at 615) and the second set of encoded bits (e.g., received at 640) according to the second polar code in order to obtain a second representation of the information bit vector and the second set of parity check bits. In some cases, the decoding operation may involve combining the LLRs for the first set of encoded bits (e.g., received at 615) with the subset of the LLRs for the second set of encoded bits (e.g., received at 640) corresponding to the first set of polarized bit channels. The second polar code may include the first set of polarized bit channels and the second set of polarized bit channels. For example, the second representation of the information bit vector may include a repetition of the at least one bit of the information bit vector in a second bit index set of the second set of polarized bits channels and the second set of parity check bits is mapped to bit channels of the second set of polarized bit channels. The second set of parity check bits may include parity check information for the at least one repeated bit of the information bit vector, for one or more information bits in the first set of polarized bit channels, or for a combination thereof.

At 650, the decoding device may communicate with the encoding device based on a result of the second decoding operation. For example, if the second decoding operation is successful, base station 105-b may transmit an ACK to UE 115-b. Alternatively, if the second decoding operation is unsuccessful, base station 105-b may transmit a NACK to UE 115-b. In some cases, the encoding device may generate and transmit additional sets of encoded bits if additional NACKs are received.

Figure 7:
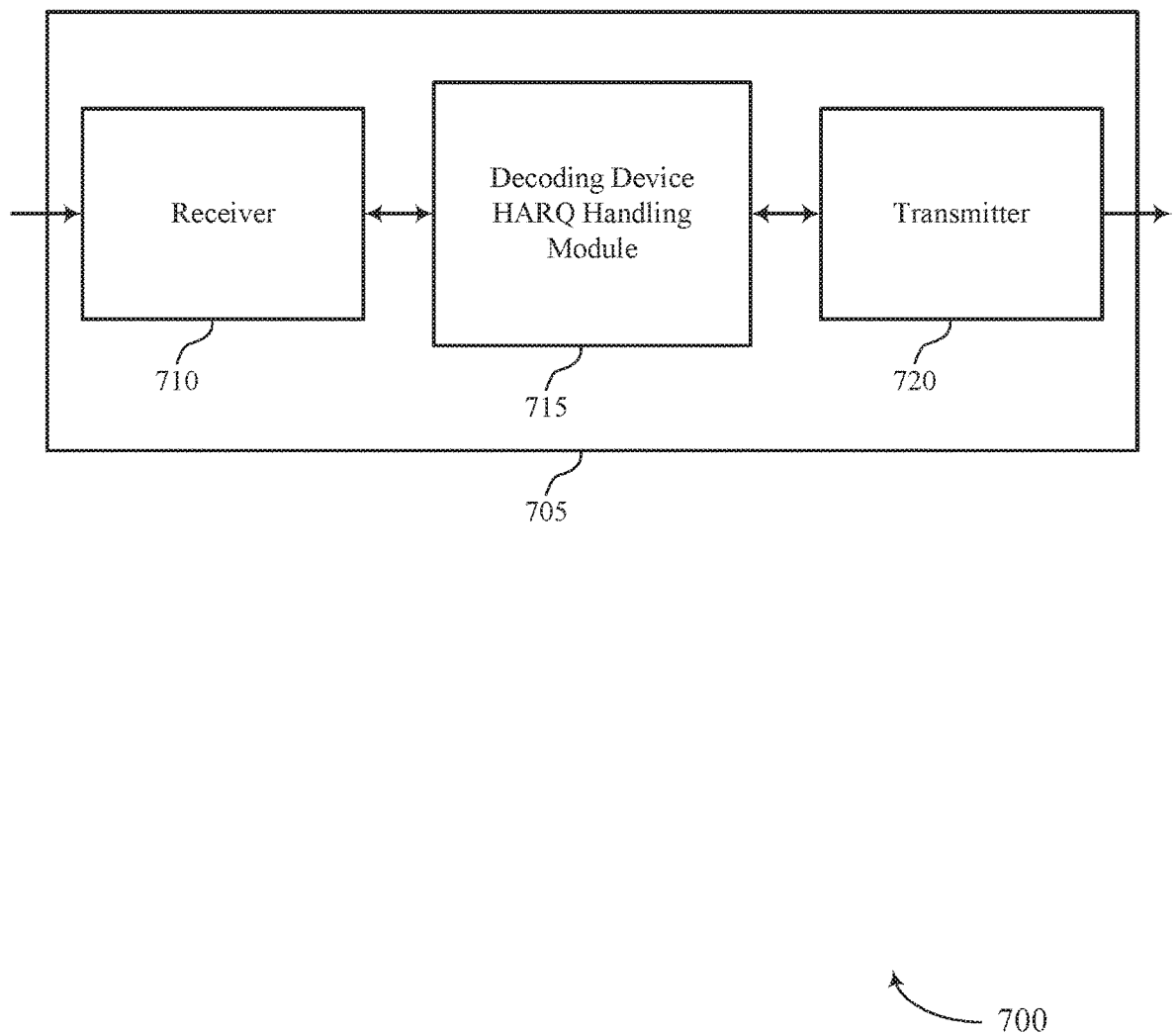
FIGS. 7 through 9 show block diagrams of a wireless device (e.g., a decoding device) that supports HARQ of polar codes with parity check bits in accordance with aspects of the present disclosure.

FIG. 7 shows a block diagram 700 of a wireless device 705 that supports HARQ of polar codes with parity check bits in accordance with aspects of the present disclosure. Wireless device 705 may be an example of aspects of a decoding device, such as a base station 105 or a UE 115, as described herein. Wireless device 705 may include receiver 710, decoding device HARQ handling module 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to HARQ of polar codes with parity check bits, etc.). Information may be passed on to other components of the device. The receiver 710 may be an example of aspects of the transceiver 1035 described with reference to FIG. 10. The receiver 710 may utilize a single antenna or a set of antennas.

Decoding device HARQ handling module 715 may be an example of aspects of the decoding device HARQ handling module 1015 described with reference to FIG. 10.

Decoding device HARQ handling module 715 and/or at least some of its various sub-components may be implemented in hardware, software executed by a processor, firmware, or any combination thereof. If implemented in software executed by a processor, the functions of the decoding device HARQ handling module 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The decoding device HARQ handling module 715 and/or at least some of its various sub-components may be physically located at various positions, including being distributed such that portions of functions are implemented at different physical locations by one or more physical devices. In some examples, decoding device HARQ handling module 715 and/or at least some of its various sub-components may be a separate and distinct component in accordance with various aspects of the present disclosure. In other examples, decoding device HARQ handling module 715 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

Decoding device HARQ handling module 715 may receive a first set of encoded bits from a device over a wireless channel and may perform a first decoding operation on the first set of encoded bits according to a first polar code to obtain a first representation of an information bit vector determined from a first set of polarized bit channels of the first polar code according to a first bit index set and a first set of parity check bits for the information bit vector. Decoding device HARQ handling module 715 may transmit, to the device, an indication that the first decoding operation was unsuccessful, receive a second set of encoded bits from the device over the wireless channel, and perform a second decoding operation on the first set of encoded bits and the second set of encoded bits according to a second polar code to obtain a second representation of the information bit vector and a second set of parity check bits. The second polar code includes the first set of polarized bit channels and a second set of polarized bit channels, and the second set of parity check bits is mapped to bit channels of the second set of polarized bit channels. Decoding device HARQ handling module 715 may then communicate with the device based on a result of the second decoding operation.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
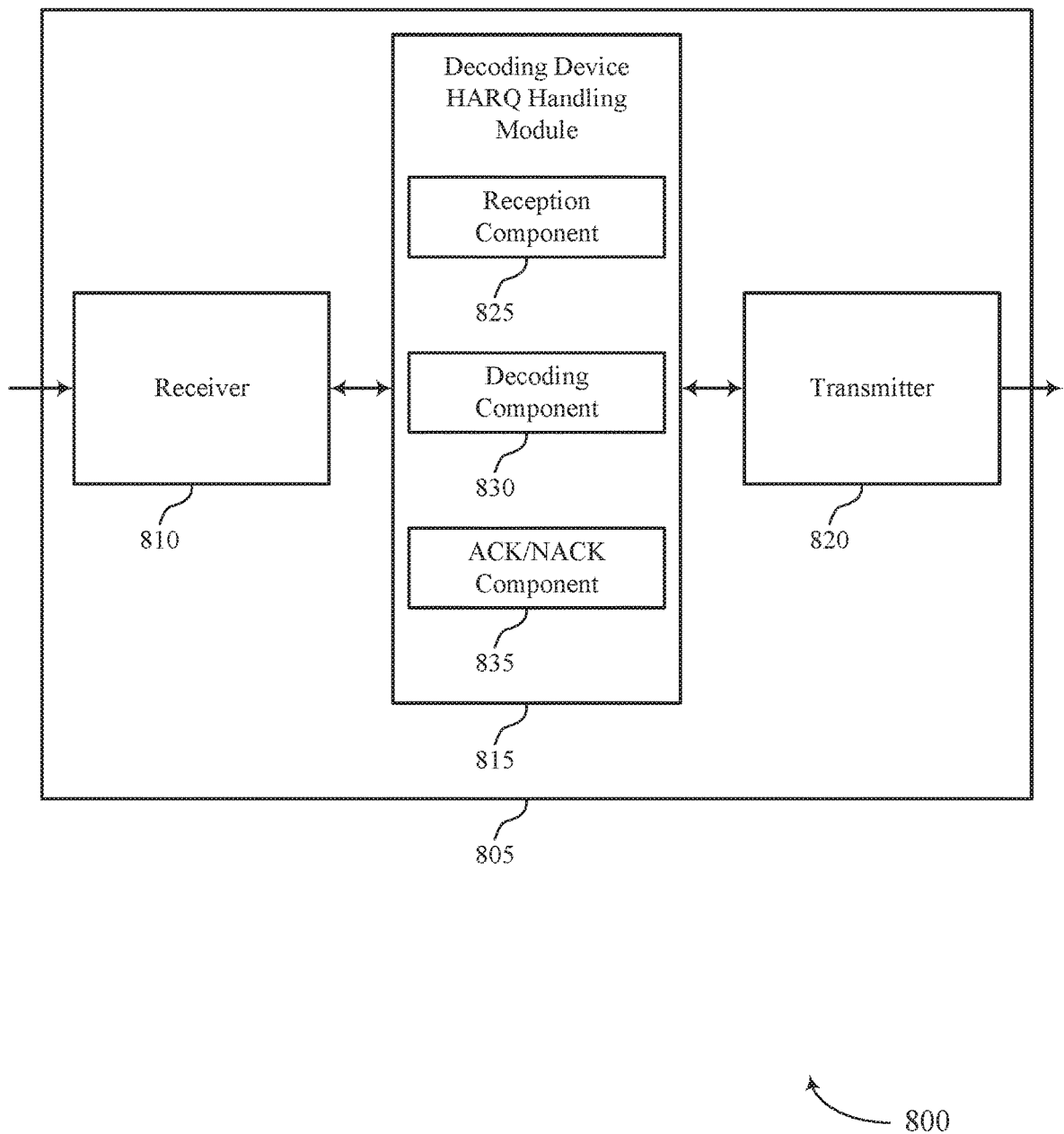

FIG. 8 shows a block diagram 800 of a wireless device 805 that supports HARQ of polar codes with parity check bits in accordance with aspects of the present disclosure. Wireless device 805 may be an example of aspects of a wireless device 705 or a decoding device, such as a base station 105 or a UE 115, as described with reference to FIG. 7. Wireless device 805 may include receiver 810, decoding device HARQ handling module 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to HARQ of polar codes with parity check bits, etc.). Information may be passed on to other components of the device. The receiver 810 may be an example of aspects of the transceiver 1035 described with reference to FIG. 10. The receiver 810 may utilize a single antenna or a set of antennas.

Decoding device HARQ handling module 815 may be an example of aspects of the decoding device HARQ handling module 1015 described with reference to FIG. 10. Decoding device HARQ handling module 815 may also include reception component 825, decoding component 830, and ACK/NACK component 835.

Reception component 825 may receive a first set of encoded bits from a device over a wireless channel. Decoding component 830 may perform a first decoding operation on the first set of encoded bits according to a first polar code to obtain a first representation of an information bit vector determined from a first set of polarized bit channels of the first polar code according to a first bit index set and a first set of parity check bits for the information bit vector. ACK/NACK component 835 may transmit, to the device, an indication that the first decoding operation was unsuccessful.

Reception component 825 may receive a second set of encoded bits from the device over the wireless channel. Decoding component 830 may perform a second decoding operation on the first set of encoded bits and the second set of encoded bits according to a second polar code to obtain a second representation of the information bit vector and a second set of parity check bits. The second polar code includes the first set of polarized bit channels and a second set of polarized bit channels, and the second set of parity check bits is mapped to bit channels of the second set of polarized bit channels. ACK/NACK component 835 may communicate with the device based on a result of the second decoding operation.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
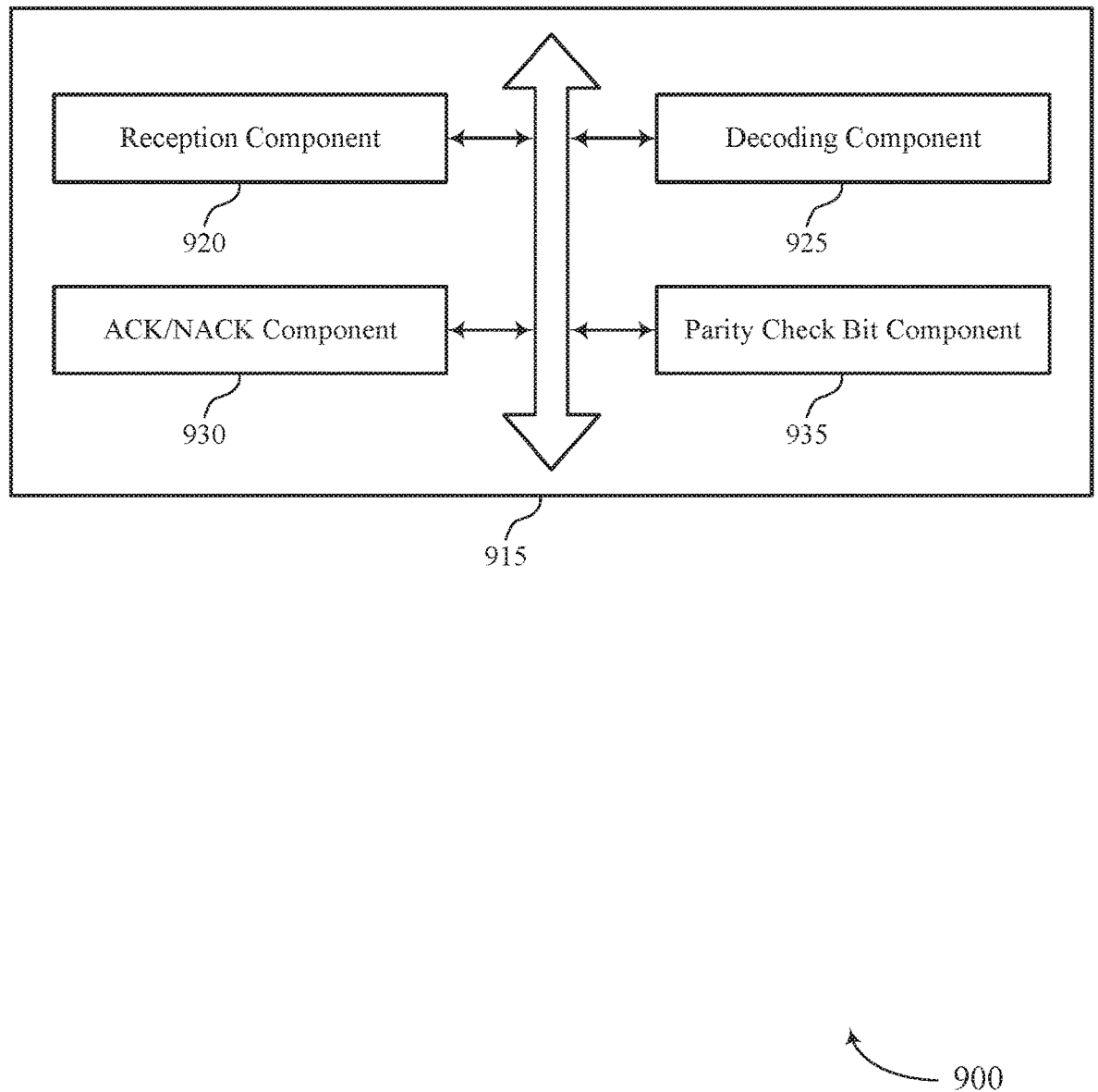

FIG. 9 shows a block diagram 900 of a decoding device HARQ handling module 915 that supports HARQ of polar codes with parity check bits in accordance with aspects of the present disclosure. The decoding device HARQ handling module 915 may be an example of aspects of a decoding device HARQ handling module 715, a decoding device HARQ handling module 815, or a decoding device HARQ handling module 1015 described with reference to FIGS. 7, 8, and 10. The decoding device HARQ handling module 915 may include reception component 920, decoding component 925, ACK/NACK component 930, and parity check bit component 935. Each of these modules may communicate, directly or indirectly, with one another (e.g., via one or more buses).

Reception component 920 may receive a first set of encoded bits from a device over a wireless channel. Decoding component 925 may perform a first decoding operation on the first set of encoded bits according to a first polar code to obtain a first representation of an information bit vector determined from a first set of polarized bit channels of the first polar code according to a first bit index set and a first set of parity check bits for the information bit vector. ACK/NACK component 930 may transmit, to the device, an indication that the first decoding operation was unsuccessful.

Reception component 920 may receive a second set of encoded bits from the device over the wireless channel. Decoding component 925 may perform a second decoding operation on the first set of encoded bits and the second set of encoded bits according to a second polar code to obtain a second representation of the information bit vector and a second set of parity check bits. The second polar code includes the first set of polarized bit channels and a second set of polarized bit channels, and the second set of parity check bits is mapped to bit channels of the second set of polarized bit channels.

In some examples of the reception component 920 described herein, the second representation of the information bit vector includes a repetition of at least one bit of the information bit vector to a second bit index set of the second set of polarized bit channels, and the second set of parity check bits includes parity check information for the at least one repeated bit of the information bit vector.

ACK/NACK component 930 may communicate with the device based on a result of the second decoding operation. In some cases, ACK/NACK component 930 may determine that the information bit vector is successfully decoded based on the second representation of the information bit vector and the second set of parity check bits, where the communicating with the device includes transmitting a second indication to the device that the second decoding operation was successful. In other cases, ACK/NACK component 930 may determine that the second decoding operation was unsuccessful based on the second representation of the information bit vector and the second set of parity check bits, where the communicating with the device includes transmitting a second indication to the device that the second decoding operation was unsuccessful.

In some cases, parity check bit component 935 may determine a number of bits for the second set of parity check bits based on one or more of a number of bits in the information bit vector, a number of bit channels in the first set of polarized bit channels, a number of bits of the at least one repeated bit of the information bit vector, or a number of bits of the first set of parity check bits. Additionally or alternatively, parity check bit component 935 may determine the bit channels for the second set of parity check bits based on one or more of a number of bits in the information bit vector, a number of bit channels in the first set of polarized bit channels, a number of bits of the at least one repeated bit of the information bit vector, or bit channel reliability information for the first and second sets of polarized bit channels. In some cases, the second set of parity check bits includes a set of parity check bits including parity check information for a subset of the at least one repeated bit of the information bit vector. In some cases, calculated values corresponding to each of the set of parity check bits include a same bit value. In some cases, calculated values corresponding to each of the set of parity check bits are determined based on a function of an index of the each of the set of parity check bits within the set of parity check bits. In some cases, at least one parity check bit of the second set of parity check bits including parity check information for a subset of the at least one repeated bit of the information bit vector is mapped to a bit channel of the second set of polarized bit channels that is located prior to at least one bit channel corresponding to the subset of the at least one repeated bit of the information bit vector.

Figure 10:
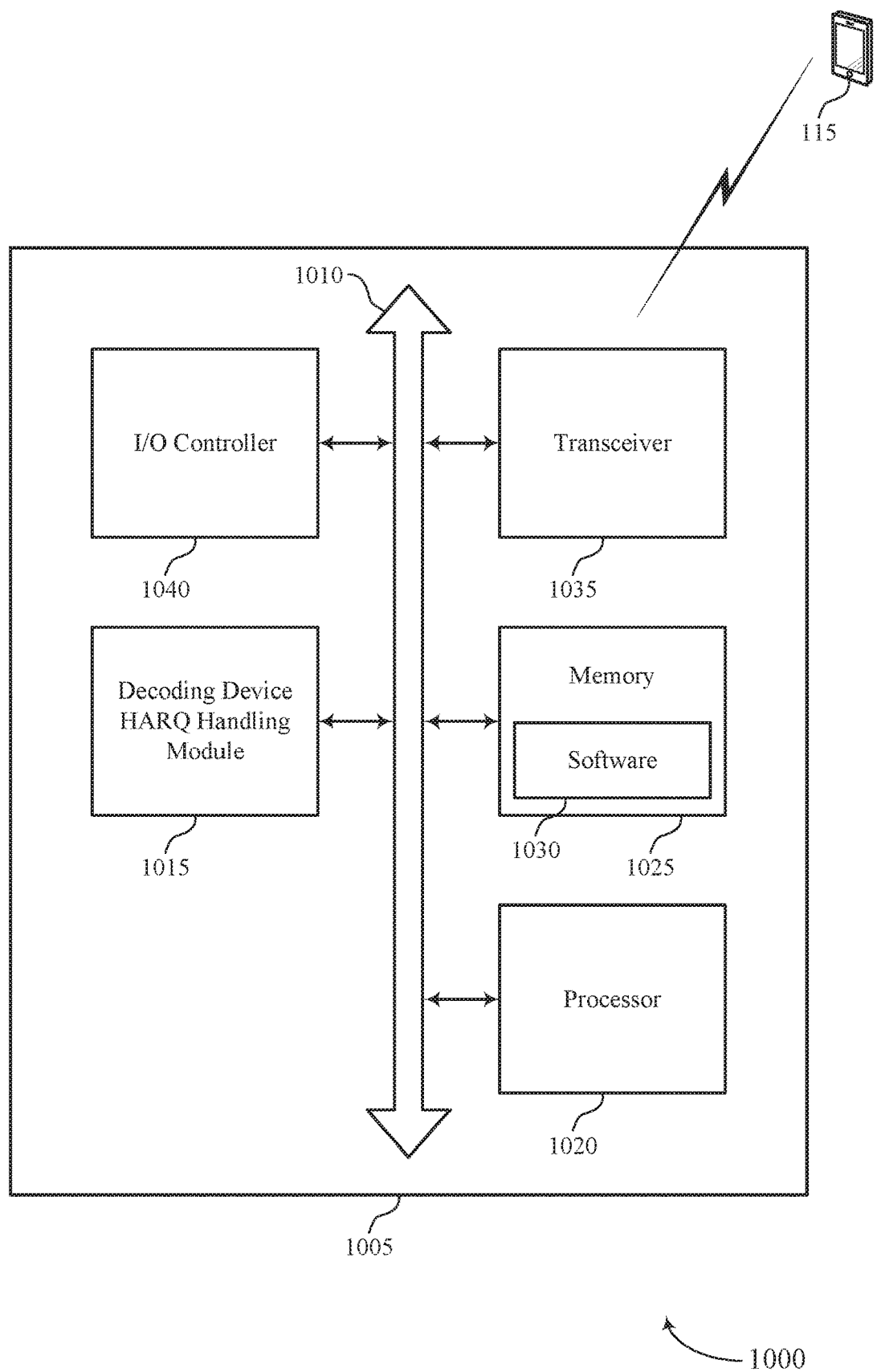
FIG. 10 illustrates a block diagram of a system including a decoding device that supports HARQ of polar codes with parity check bits in accordance with aspects of the present disclosure.

FIG. 10 shows a diagram of a system 1000 including a device 1005 that supports HARQ of polar codes with parity check bits in accordance with aspects of the present disclosure. Device 1005 may be an example of or include the components of wireless device 705, wireless device 805, or a decoding device, such as a base station 105 or a UE 115 as described herein e.g., with reference to FIGS. 7 and 8. Device 1005 may include components for bi-directional voice and data communications including components for transmitting and receiving communications, including decoding device HARQ handling module 1015, processor 1020, memory 1025, software 1030, transceiver 1035, and I/O controller 1040. These components may be in electronic communication via one or more buses (e.g., bus 1010).

Processor 1020 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting HARQ of polar codes with parity check bits).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support HARQ of polar codes with parity check bits. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described herein. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

I/O controller 1040 may manage input and output signals for device 1005. I/O controller 1040 may also manage peripherals not integrated into device 1005. In some cases, I/O controller 1040 may represent a physical connection or port to an external peripheral. In some cases, I/O controller 1040 may utilize an operating system such as iOS®, ANDROID®, MS-DOS®, MS-WINDOWS®, OS/2®, UNIX®, LINUX®, or another known operating system. In other cases, I/O controller 1040 may represent or interact with a modem, a keyboard, a mouse, a touchscreen, or a similar device. In some cases, I/O controller 1040 may be implemented as part of a processor. In some cases, a user may interact with device 1005 via I/O controller 1040 or via hardware components controlled by I/O controller 1040.

Figure 11:
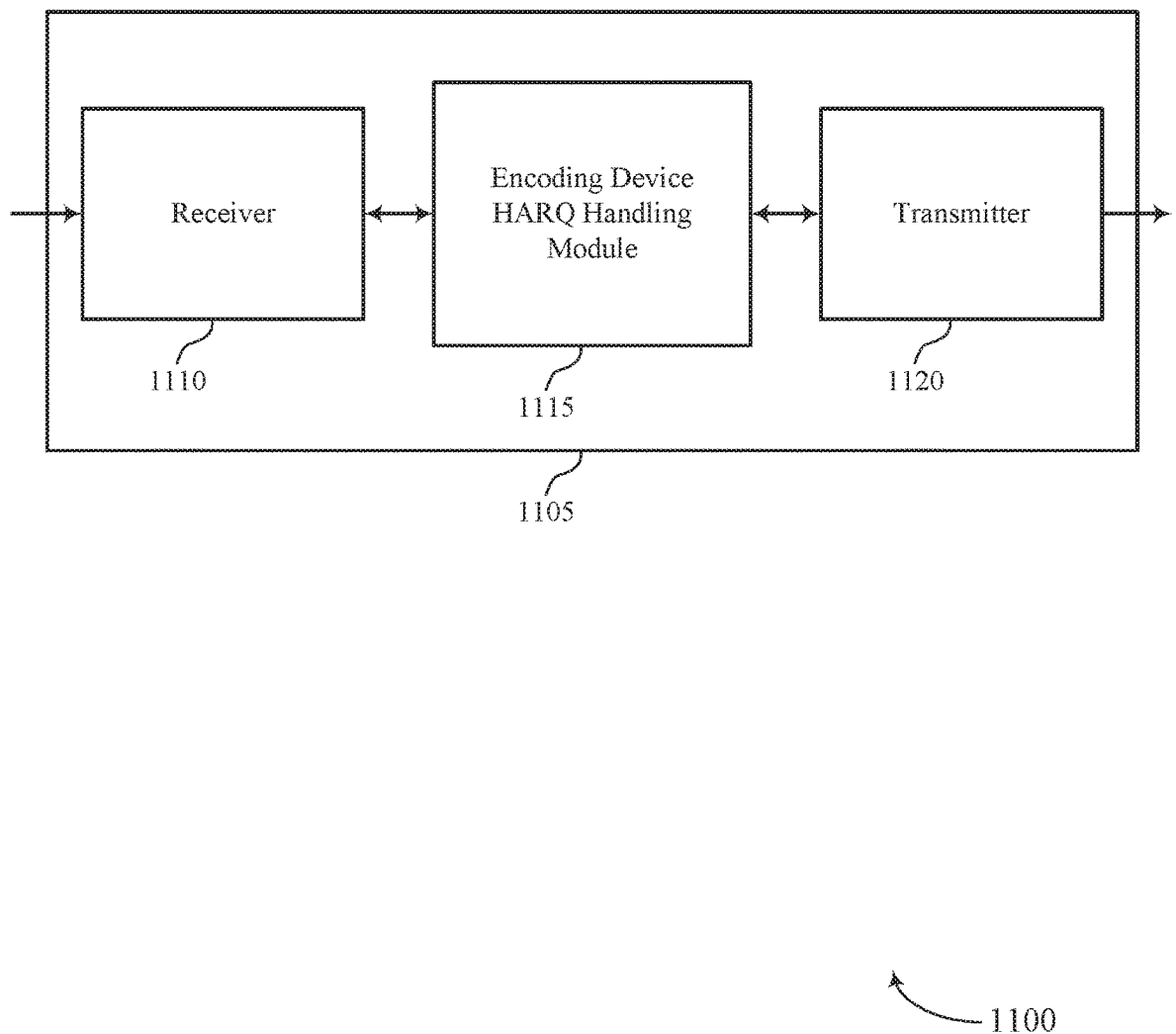
FIGS. 11 through 13 show block diagrams of a wireless device (e.g., an encoding device) that supports HARQ of polar codes with parity check bits in accordance with aspects of the present disclosure.

FIG. 11 shows a block diagram 1100 of a wireless device 1105 that supports HARQ of polar codes with parity check bits in accordance with aspects of the present disclosure. Wireless device 1105 may be an example of aspects of an encoding device, such as a base station 105 or a UE 115, as described herein. Wireless device 1105 may include receiver 1110, encoding device HARQ handling module 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to HARQ of polar codes with parity check bits, etc.). Information may be passed on to other components of the device. The receiver 1110 may be an example of aspects of the transceiver 1435 described with reference to FIG. 14. The receiver 1110 may utilize a single antenna or a set of antennas.

Encoding device HARQ handling module 1115 may be an example of aspects of the encoding device HARQ handling module 1415 described with reference to FIG. 14.

Encoding device HARQ handling module 1115 and/or at least some of its various sub-components may be implemented in hardware, software executed by a processor, firmware, or any combination thereof. If implemented in software executed by a processor, the functions of the encoding device HARQ handling module 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The encoding device HARQ handling module 1115 and/or at least some of its various sub-components may be physically located at various positions, including being distributed such that portions of functions are implemented at different physical locations by one or more physical devices. In some examples, encoding device HARQ handling module 1115 and/or at least some of its various sub-components may be a separate and distinct component in accordance with various aspects of the present disclosure. In other examples, encoding device HARQ handling module 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Encoding device HARQ handling module 1115 may determine a first set of parity check bits based on an information bit vector, generate a first set of encoded bits by mapping the information bit vector to a first set of polarized bit channels of a first polar code according to a first bit index set and mapping the first set of parity check bits to other bit channels of the first set of polarized bit channels, and transmit the first set of encoded bits to a device over a wireless channel. Encoding device HARQ handling module 1115 may receive, from the device, an indication that a first decoding operation performed on the first set of encoded bits was unsuccessful, determine a second set of parity check bits based on at least one bit of the information bit vector. Encoding device HARQ handling module 1115 may generate a second set of encoded bits by mapping the second set of parity check bits to bit channels of a second set of polarized bit channels of a second polar code, where the second polar code is a superset of the first polar code. Encoding device HARQ handling module 1115 may transmit the second set of encoded bits to the device over the wireless channel and may communicate with the device based on a result of a second decoding operation performed on the first set of encoded bits and the second set of encoded bits.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
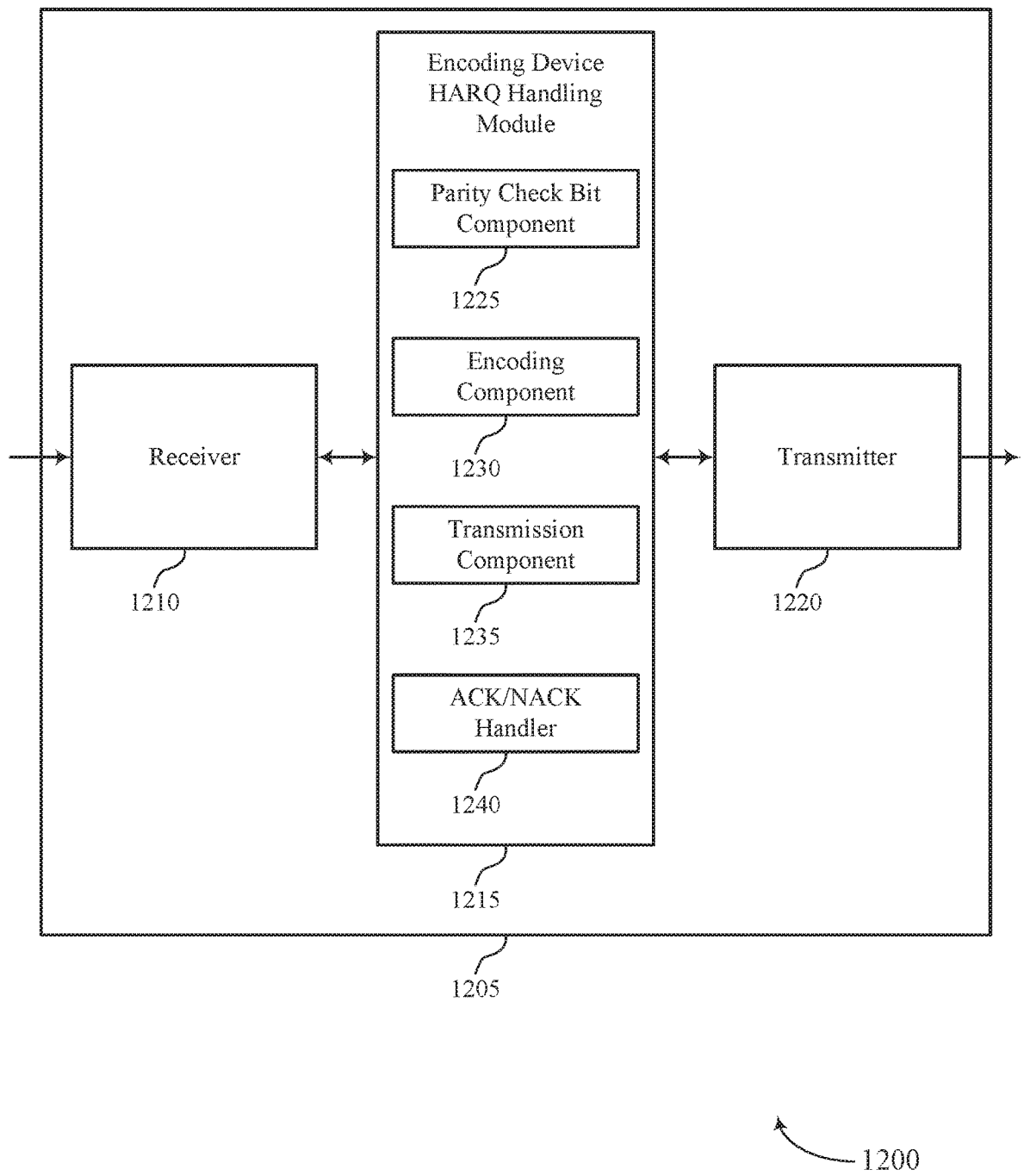

FIG. 12 shows a block diagram 1200 of a wireless device 1205 that supports HARQ of polar codes with parity check bits in accordance with aspects of the present disclosure. Wireless device 1205 may be an example of aspects of a wireless device 1105 or an encoding device, such as a base station 105 or a UE 115, as described with reference to FIG. 11. Wireless device 1205 may include receiver 1210, encoding device HARQ handling module 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to HARQ of polar codes with parity check bits, etc.). Information may be passed on to other components of the device. The receiver 1210 may be an example of aspects of the transceiver 1435 described with reference to FIG. 14. The receiver 1210 may utilize a single antenna or a set of antennas.

Encoding device HARQ handling module 1215 may be an example of aspects of the encoding device HARQ handling module 1415 described with reference to FIG. 14. Encoding device HARQ handling module 1215 may also include parity check bit component 1225, encoding component 1230, transmission component 1235, and ACK/NACK handler 1240.

Parity check bit component 1225 may determine a first set of parity check bits based on an information bit vector. Encoding component 1230 may generate a first set of encoded bits by mapping the information bit vector to a first set of polarized bit channels of a first polar code according to a first bit index set and mapping the first set of parity check bits to other bit channels of the first set of polarized bit channels.

Transmission component 1235 may transmit the first set of encoded bits to a device over a wireless channel. ACK/NACK handler 1240 may receive, from the device, an indication that a first decoding operation performed on the first set of encoded bits was unsuccessful.

Parity check bit component 1225 may determine a second set of parity check bits based on at least one bit of the information bit vector. Encoding component 1230 may generate a second set of encoded bits by mapping the second set of parity check bits to bit channels of a second set of polarized bit channels of a second polar code, where the second polar code is a superset of the first polar code.

Transmission component 1235 may transmit the second set of encoded bits to the device over the wireless channel. ACK/NACK handler 1240 may communicate with the device based on a result of a second decoding operation performed on the first set of encoded bits and the second set of encoded bits.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
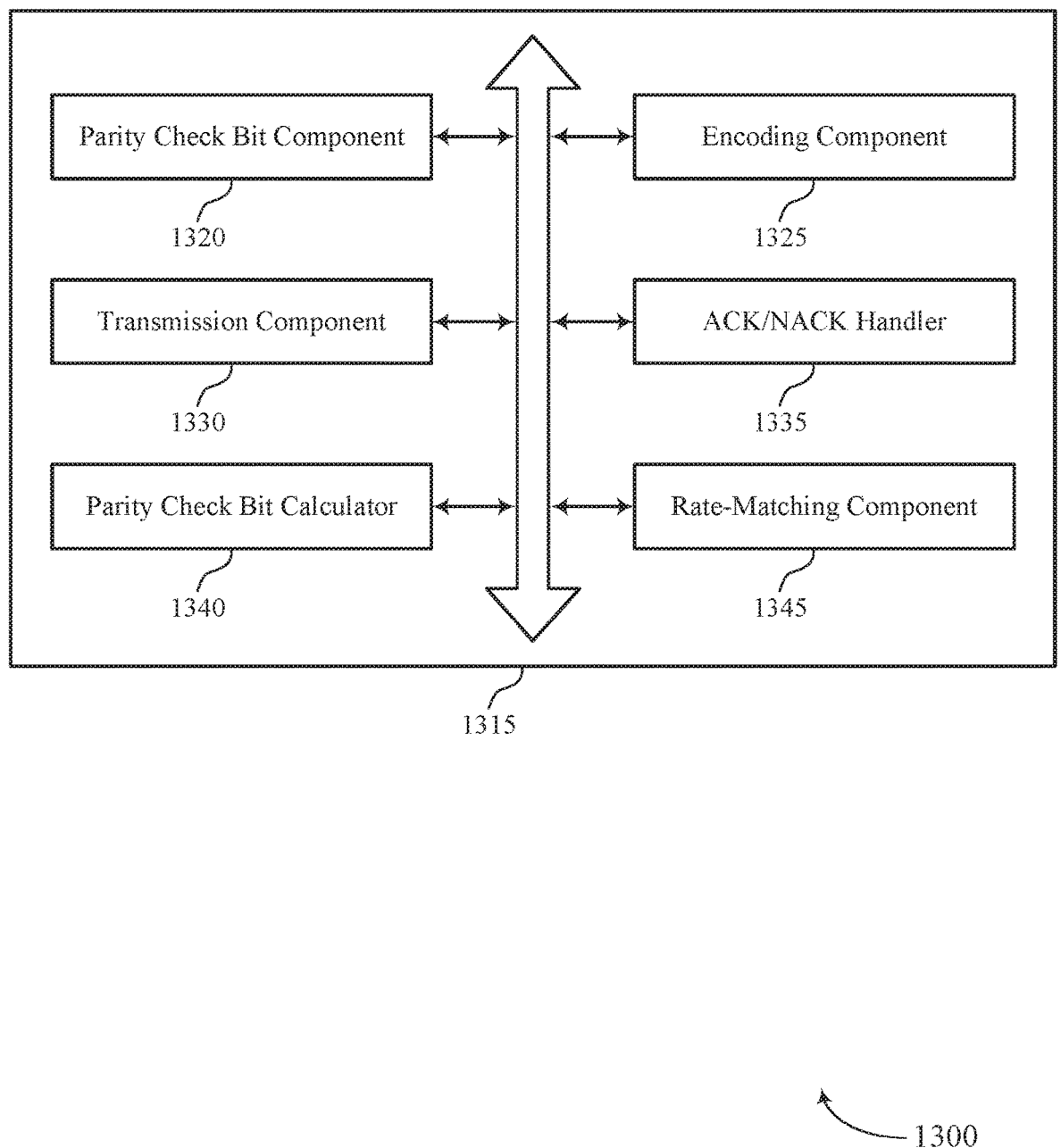

FIG. 13 shows a block diagram 1300 of an encoding device HARQ handling module 1315 that supports HARQ of polar codes with parity check bits in accordance with aspects of the present disclosure. The encoding device HARQ handling module 1315 may be an example of aspects of an encoding device HARQ handling module 1415 described with reference to FIGS. 11, 12, and 14. The encoding device HARQ handling module 1315 may include parity check bit component 1320, encoding component 1325, transmission component 1330, ACK/NACK handler 1335, parity check bit calculator 1340, and rate-matching component 1345. Each of these modules may communicate, directly or indirectly, with one another (e.g., via one or more buses).

Parity check bit component 1320 may determine a first set of parity check bits based on an information bit vector. Encoding component 1325 may generate a first set of encoded bits by mapping the information bit vector to a first set of polarized bit channels of a first polar code according to a first bit index set and mapping the first set of parity check bits to other bit channels of the first set of polarized bit channels. Transmission component 1330 may transmit the first set of encoded bits to a device over a wireless channel. ACK/NACK handler 1335 may receive, from the device, an indication that a first decoding operation performed on the first set of encoded bits was unsuccessful.

Parity check bit component 1320 may determine a second set of parity check bits based on at least one bit of the information bit vector. Encoding component 1325 may generate a second set of encoded bits by mapping the second set of parity check bits to bit channels of a second set of polarized bit channels of a second polar code, where the second polar code is a superset of the first polar code. Transmission component 1330 may transmit the second set of encoded bits to the device over the wireless channel.

In some examples of the parity check bit component 1320 described herein, the second set of encoded bits is generated by mapping a repetition of the at least one bit of the information bit vector to the second set of polarized bit channels of the second polar code according to a second bit index set and mapping the second set of parity check bits to other bit channels of the second set of polarized bit channels.

ACK/NACK handler 1335 may communicate with the device based on a result of a second decoding operation performed on the first set of encoded bits and the second set of encoded bits. In some cases, the communicating with the device includes receiving, from the device, a second indication that the second decoding operation was successful. In some cases, the communicating with the device includes receiving, from the device, a second indication that the second decoding operation was unsuccessful.

In some cases, parity check bit component 1320 may determine a number of bits for the second set of parity check bits based on one or more of a number of bits in the information bit vector, a number of bit channels in the first set of polarized bit channels, a number of bits of the at least one bit of the information bit vector for repetition, or a number of bits of the first set of parity check bits. Additionally or alternatively, parity check bit component 1320 may determine the other bit channels of the second set of polarized bit channels for the second set of parity check bits based on one or more of a number of bits in the information bit vector, a number of bit channels in the first set of polarized bit channels, a number of bits of the at least one bit of the information bit vector for repetition, or bit channel reliability information for the first and second sets of polarized bit channels. In some cases, parity check bit component 1320 may map at least one parity check bit of the second set of parity check bits including parity check information for a subset of the at least one bit of the information bit vector for repetition to a bit channel of the second set of polarized bit channels that is located prior to at least one bit channel corresponding to the subset of the at least one bit of the information bit vector for repetition.

In some cases, the second set of parity check bits includes a set of parity check bits including parity check information for a subset of the at least one bit of the information bit vector for repetition. In some cases, parity check bit calculator 1340 may calculate a same bit value corresponding to each of the set of parity check bits. In other cases, parity check bit calculator 1340 may calculate values corresponding to each of the set of parity check bits based on a function of an index of the each of the set of parity check bits within the set of parity check bits.

Rate-matching component 1345 may perform rate matching on one or both of the first set of encoded bits or the second set of encoded bits, where one or both of the transmitting the first set of encoded bits or the transmitting the second set of encoded bits is based on the rate matching.

Figure 14:
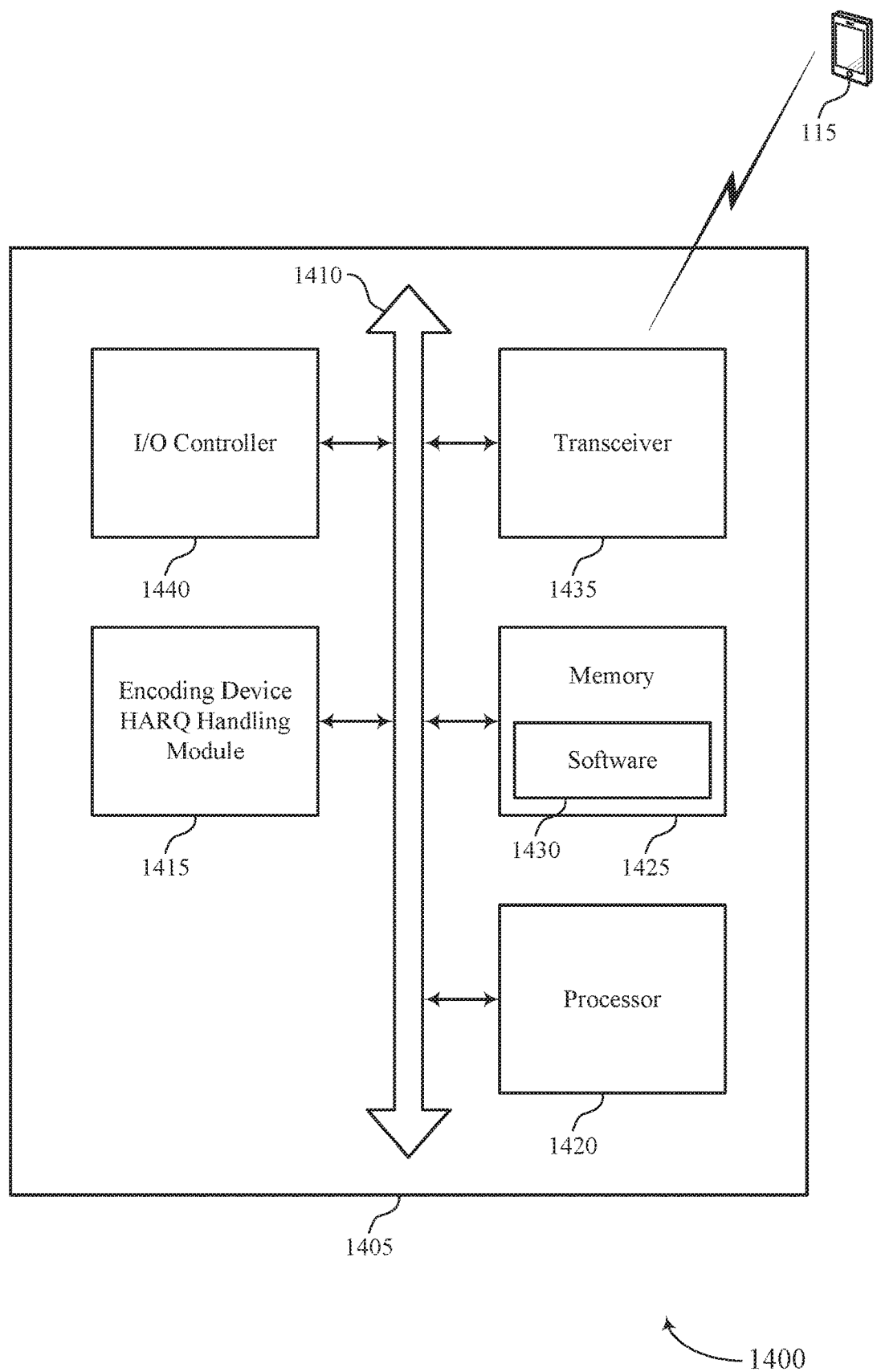
FIG. 14 illustrates a block diagram of a system including an encoding device that supports HARQ of polar codes with parity check bits in accordance with aspects of the present disclosure.

FIG. 14 shows a diagram of a system 1400 including a device 1405 that supports HARQ of polar codes with parity check bits in accordance with aspects of the present disclosure. Device 1405 may be an example of or include the components of an encoding device, such as a base station 105 or a UE 115, as described herein, e.g., with reference to FIGS. 1 through 6. Device 1405 may include components for bi-directional voice and data communications including components for transmitting and receiving communications, including encoding device HARQ handling module 1415, processor 1420, memory 1425, software 1430, transceiver 1435, and I/O controller 1440. These components may be in electronic communication via one or more buses (e.g., bus 1410).

Processor 1420 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting HARQ of polar codes with parity check bits).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support HARQ of polar codes with parity check bits. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described herein. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

I/O controller 1440 may manage input and output signals for device 1405. I/O controller 1440 may also manage peripherals not integrated into device 1405. In some cases, I/O controller 1440 may represent a physical connection or port to an external peripheral. In some cases, I/O controller 1440 may utilize an operating system such as iOS®, ANDROID®, MS-DOS®, MS-WINDOWS®, OS/2®, UNIX®, LINUX®, or another known operating system. In other cases, I/O controller 1440 may represent or interact with a modem, a keyboard, a mouse, a touchscreen, or a similar device. In some cases, I/O controller 1440 may be implemented as part of a processor. In some cases, a user may interact with device 1405 via I/O controller 1440 or via hardware components controlled by I/O controller 1440.

Figure 15:
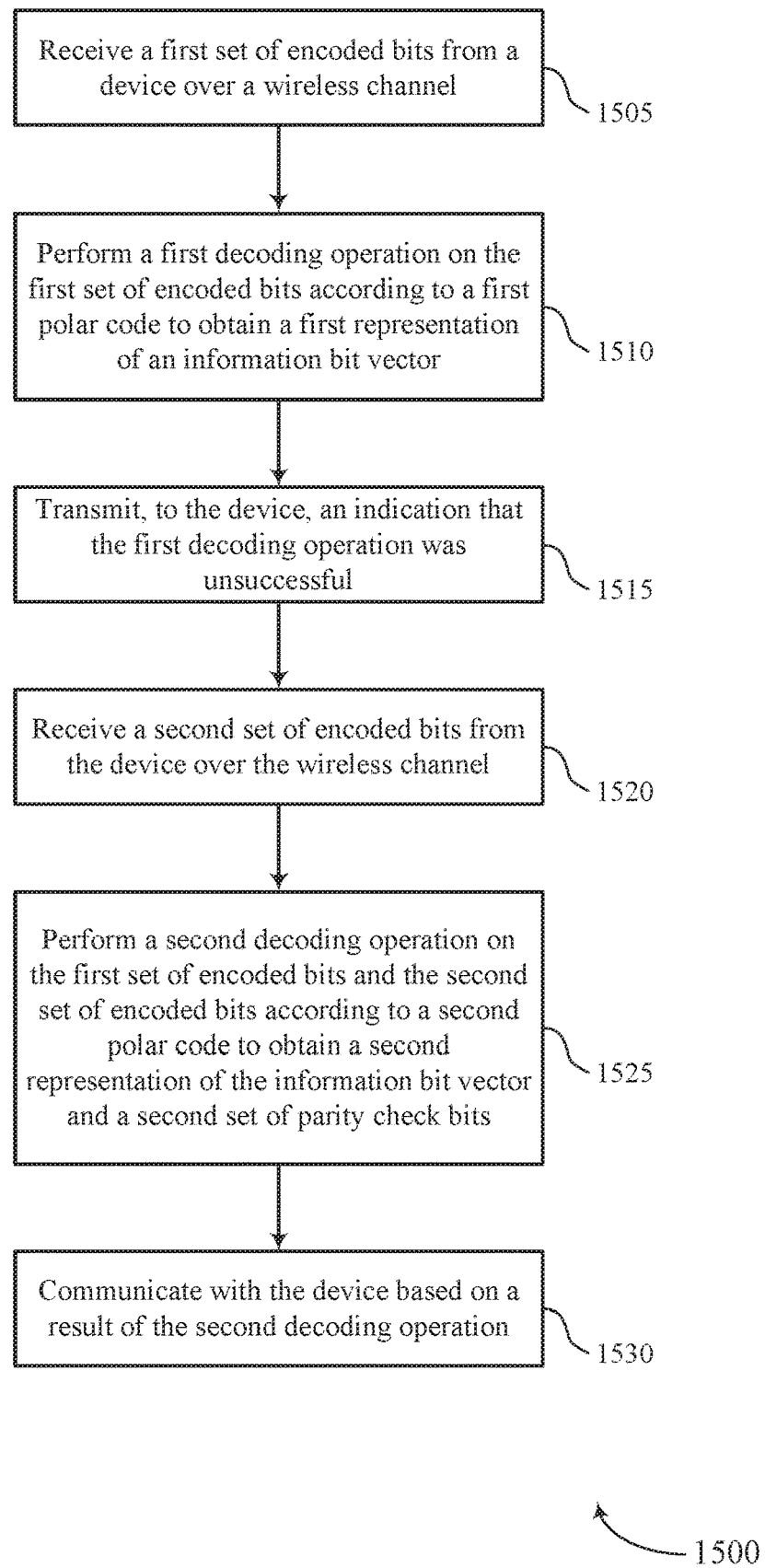
FIGS. 15 through 17 illustrate methods for HARQ of polar codes with parity check bits in accordance with aspects of the present disclosure.

FIG. 15 shows a flowchart illustrating a method 1500 for HARQ of polar codes with parity check bits in accordance with aspects of the present disclosure. The operations of method 1500 may be implemented by a decoding device (e.g., a base station 105, UE 115, etc.) or its components as described herein. For example, the operations of method 1500 may be performed by a decoding device HARQ handling module as described with reference to FIGS. 7 through 10. In some examples, a decoding device may execute a set of codes to control the functional elements of the device to perform the functions described herein. Additionally or alternatively, the decoding device may perform aspects of the functions described herein using special-purpose hardware.

At 1505 the decoding device may receive a first set of encoded bits from a device over a wireless channel. The operations of 1505 may be performed according to the methods described herein. In certain examples, aspects of the operations of 1505 may be performed by a reception component as described with reference to FIGS. 7 through 10.

At 1510 the decoding device may perform a first decoding operation on the first set of encoded bits according to a first polar code to obtain a first representation of an information bit vector determined from a first set of polarized bit channels of the first polar code according to a first bit index set and a first set of parity check bits for the information bit vector. The operations of 1510 may be performed according to the methods described herein. In certain examples, aspects of the operations of 1510 may be performed by a decoding component as described with reference to FIGS. 7 through 10.

At 1515 the decoding device may transmit, to the device, an indication that the first decoding operation was unsuccessful. The operations of 1515 may be performed according to the methods described herein. In certain examples, aspects of the operations of 1515 may be performed by an ACK/NACK component as described with reference to FIGS. 7 through 10.

At 1520 the decoding device may receive a second set of encoded bits from the device over the wireless channel. The operations of 1520 may be performed according to the methods described herein. In certain examples, aspects of the operations of 1520 may be performed by a reception component as described with reference to FIGS. 7 through 10.

At 1525 the decoding device may perform a second decoding operation on the first set of encoded bits and the second set of encoded bits according to a second polar code to obtain a second representation of the information bit vector and a second set of parity check bits. The second polar code includes the first set of polarized bit channels and a second set of polarized bit channels, and the second set of parity check bits is mapped to bit channels of the second set of polarized bit channels. The operations of 1525 may be performed according to the methods described herein. In certain examples, aspects of the operations of 1525 may be performed by a decoding component as described with reference to FIGS. 7 through 10.

At 1530 the decoding device may communicate with the device based at least in part on a result of the second decoding operation. The operations of 1530 may be performed according to the methods described herein. In certain examples, aspects of the operations of 1530 may be performed by an ACK/NACK component as described with reference to FIGS. 7 through 10.

Figure 16:
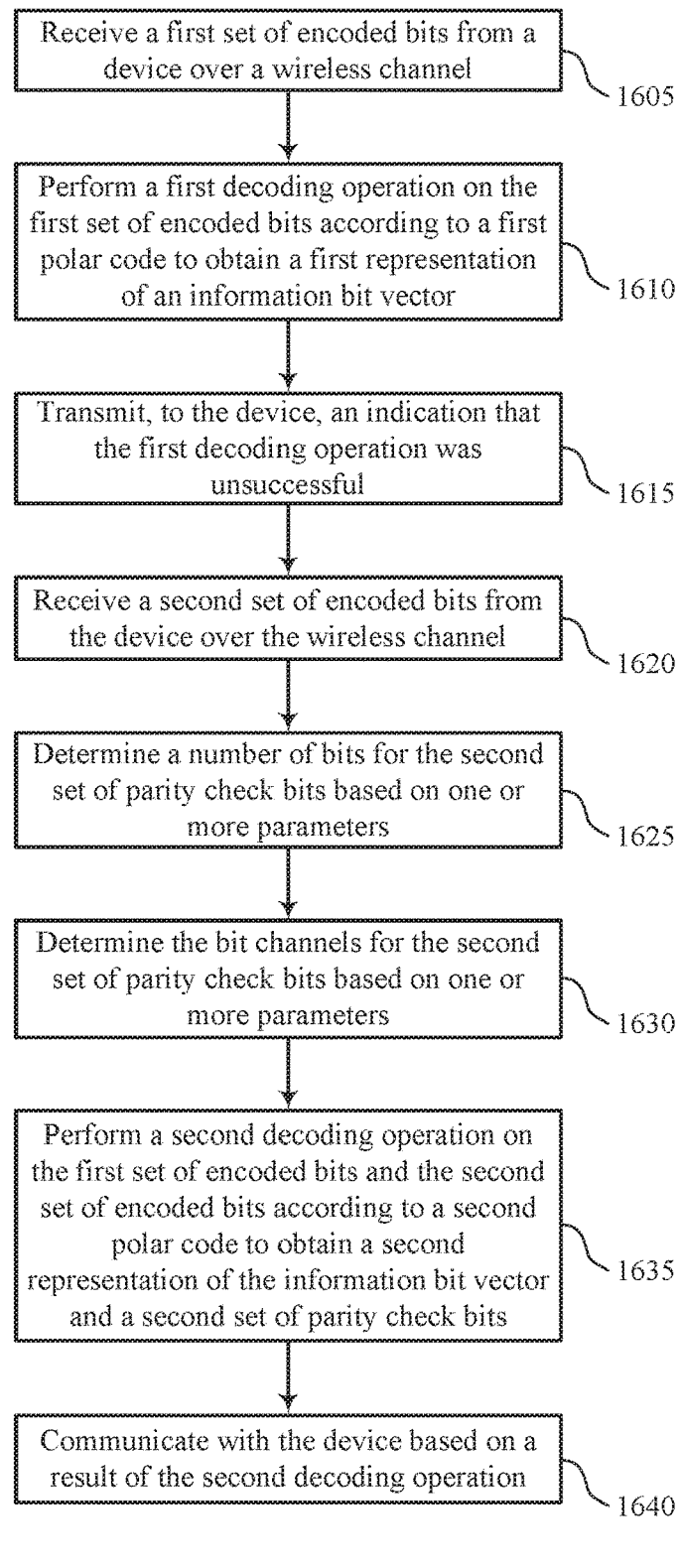

FIG. 16 shows a flowchart illustrating a method 1600 for HARQ of polar codes with parity check bits in accordance with aspects of the present disclosure. The operations of method 1600 may be implemented by a decoding device, such as a base station 105 or a UE 115, or its components as described herein. For example, the operations of method 1600 may be performed by a decoding device HARQ handling module as described with reference to FIGS. 7 through 10. In some examples, a decoding device may execute a set of codes to control the functional elements of the device to perform the functions described herein. Additionally or alternatively, the decoding device may perform aspects of the functions described herein using special-purpose hardware.

At 1605 the decoding device may receive a first set of encoded bits from a device over a wireless channel. The operations of 1605 may be performed according to the methods described herein. In certain examples, aspects of the operations of 1605 may be performed by a reception component as described with reference to FIGS. 7 through 10.

At 1610 the decoding device may perform a first decoding operation on the first set of encoded bits according to a first polar code to obtain a first representation of an information bit vector determined from a first set of polarized bit channels of the first polar code according to a first bit index set and a first set of parity check bits for the information bit vector. The operations of 1610 may be performed according to the methods described herein. In certain examples, aspects of the operations of 1610 may be performed by a decoding component as described with reference to FIGS. 7 through 10.

At 1615 the decoding device may transmit, to the device, an indication that the first decoding operation was unsuccessful. The operations of 1615 may be performed according to the methods described herein. In certain examples, aspects of the operations of 1615 may be performed by an ACK/NACK component as described with reference to FIGS. 7 through 10.

At 1620 the decoding device may receive a second set of encoded bits from the device over the wireless channel. The operations of 1620 may be performed according to the methods described herein. In certain examples, aspects of the operations of 1620 may be performed by a reception component as described with reference to FIGS. 7 through 10.

At 1625 the decoding device may determine a number of bits for the second set of parity check bits based at least in part on one or more of a number of bits in the information bit vector, a number of bit channels in the first set of polarized bit channels, a number of bits of the at least one repeated bit of the information bit vector, or a number of bits of the first set of parity check bits. The operations of 1625 may be performed according to the methods described herein. In certain examples, aspects of the operations of 1625 may be performed by a parity check bit component as described with reference to FIGS. 7 through 10.

At 1630 the decoding device may determine the bit channels for the second set of parity check bits based at least in part on one or more of a number of bits in the information bit vector, a number of bit channels in the first set of polarized bit channels, a number of bits of the at least one repeated bit of the information bit vector, or bit channel reliability information for the first and second sets of polarized bit channels. The operations of 1630 may be performed according to the methods described herein. In certain examples, aspects of the operations of 1630 may be performed by a parity check bit component as described with reference to FIGS. 7 through 10.

At 1635 the decoding device may perform a second decoding operation on the first set of encoded bits and the second set of encoded bits according to a second polar code to obtain a second representation of the information bit vector and a second set of parity check bits. The second polar code includes the first set of polarized bit channels and a second set of polarized bit channels, and the second set of parity check bits is mapped to bit channels of the second set of polarized bit channels. The operations of 1635 may be performed according to the methods described herein. In certain examples, aspects of the operations of 1635 may be performed by a decoding component as described with reference to FIGS. 7 through 10.

At 1640 the decoding device may communicate with the device based at least in part on a result of the second decoding operation. The operations of 1640 may be performed according to the methods described herein. In certain examples, aspects of the operations of 1640 may be performed by an ACK/NACK component as described with reference to FIGS. 7 through 10.

Figure 17:
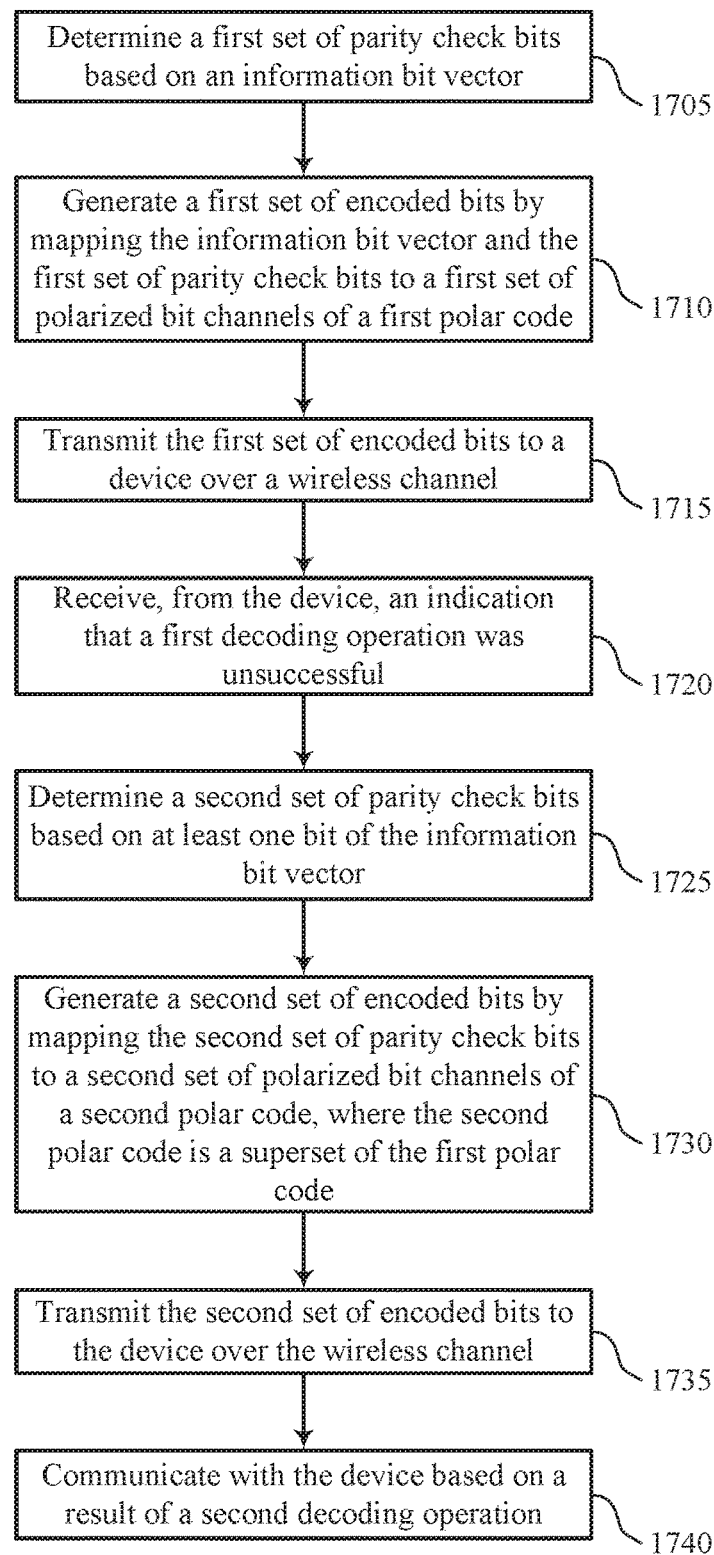

FIG. 17 shows a flowchart illustrating a method 1700 for HARQ of polar codes with parity check bits in accordance with aspects of the present disclosure. The operations of method 1700 may be implemented by an encoding device, such as a base station 105 or a UE 115, or its components as described herein. For example, the operations of method 1700 may be performed by an encoding device HARQ handling module as described with reference to FIGS. 11 through 14. In some examples, an encoding device may execute a set of codes to control the functional elements of the device to perform the functions described herein. Additionally or alternatively, the encoding device may perform aspects of the functions described herein using special-purpose hardware.

At 1705 the encoding device may determine a first set of parity check bits based at least in part on an information bit vector. The operations of 1705 may be performed according to the methods described herein. In certain examples, aspects of the operations of 1705 may be performed by a parity check bit component as described with reference to FIGS. 11 through 14.

At 1710 the encoding device may generate a first set of encoded bits by mapping the information bit vector to a first set of polarized bit channels of a first polar code according to a first bit index set and mapping the first set of parity check bits to other bit channels of the first set of polarized bit channels. The operations of 1710 may be performed according to the methods described herein. In certain examples, aspects of the operations of 1710 may be performed by an encoding component as described with reference to FIGS. 11 through 14.

At 1715 the encoding device may transmit the first set of encoded bits to a device over a wireless channel. The operations of 1715 may be performed according to the methods described herein. In certain examples, aspects of the operations of 1715 may be performed by a transmission component as described with reference to FIGS. 11 through 14.

At 1720 the encoding device may receive, from the device, an indication that a first decoding operation performed on the first set of encoded bits was unsuccessful. The operations of 1720 may be performed according to the methods described herein. In certain examples, aspects of the operations of 1720 may be performed by an ACK/NACK handler as described with reference to FIGS. 11 through 14.

At 1725 the encoding device may determine a second set of parity check bits based at least in part on at least one bit of the information bit vector. The operations of 1725 may be performed according to the methods described herein. In certain examples, aspects of the operations of 1725 may be performed by a parity check bit component as described with reference to FIGS. 11 through 14.

At 1730 the encoding device may generate a second set of encoded bits by mapping the second set of parity check bits to bit channels of a second set of polarized bit channels of a second polar code, where the second polar code is a superset of the first polar code. The operations of 1730 may be performed according to the methods described herein. In certain examples, aspects of the operations of 1730 may be performed by an encoding component as described with reference to FIGS. 11 through 14.

At 1735 the encoding device may transmit the second set of encoded bits to the device over the wireless channel. The operations of 1735 may be performed according to the methods described herein. In certain examples, aspects of the operations of 1735 may be performed by a transmission component as described with reference to FIGS. 11 through 14.

At 1740 the encoding device may communicate with the device based at least in part on a result of a second decoding operation performed on the first set of encoded bits and the second set of encoded bits. The operations of 1740 may be performed according to the methods described herein. In certain examples, aspects of the operations of 1740 may be performed by an ACK/NACK handler as described with reference to FIGS. 11 through 14.

Described below are a number of examples of methods, systems or apparatuses including means for implementing methods or realizing apparatuses, non-transitory computer-readable medium storing instructions executable by one or more processors to cause the one or more processors to implement methods, and systems including one or more processors and memory in electronic communication with the one or more processors storing instructions executable by the one or more processors to cause the system or apparatus to implement methods. It is to be understood that these are just some examples of possible implementations, and other examples will be readily apparent to those skilled in the art without departing from the scope of the disclosure.

Example 1 is a method of wireless communication that includes receiving a first set of encoded bits from a device over a wireless channel, and performing a first decoding operation on the first set of encoded bits according to a first polar code to obtain a first representation of an information bit vector determined from a first set of polarized bit channels of the first polar code according to a first bit index set and a first set of parity check bits for the information bit vector. The method of Example 1 further includes transmitting, to the device, an indication that the first decoding operation was unsuccessful, receiving a second set of encoded bits from the device over the wireless channel, and performing a second decoding operation on the first set of encoded bits and the second set of encoded bits according to a second polar code to obtain a second representation of the information bit vector and a second set of parity check bits, where the second polar code includes the first set of polarized bit channels and a second set of polarized bit channels, and the second set of parity check bits is mapped to bit channels of the second set of polarized bit channels. The method of Example 1 additionally includes communicating with the device based at least in part on a result of the second decoding operation.

In Example 2, the method of Example 1 further includes determining that the information bit vector is successfully decoded based at least in part on the second representation of the information bit vector and the second set of parity check bits, where the communicating with the device includes transmitting a second indication to the device that the second decoding operation was successful.

In Example 3, the method of Example 1 further includes determining that the second decoding operation is unsuccessful based at least in part on the second representation of the information bit vector and the second set of parity check bits, where the communicating with the device includes transmitting a second indication to the device that the second decoding operation was unsuccessful.

In Example 4, the second representation of the information bit vector of Examples 1-3 includes a repetition of at least one bit of the information bit vector to a second bit index set of the second set of polarized bit channels, and the second set of parity check bits of Examples 1-3 include parity check information for the at least one repeated bit of the information bit vector.

In Example 5, the method of any of Examples 1-4 further includes determining a number of bits for the second set of parity check bits based at least in part on one or more of a number of bits in the information bit vector, a number of bit channels in the first set of polarized bit channels, a number of bits of the at least one repeated bit of the information bit vector, or a number of bits of the first set of parity check bits.

In Example 6, the method of any of Examples 1-5 further includes determining the bit channels for the second set of parity check bits based at least in part on one or more of a number of bits in the information bit vector, a number of bit channels in the first set of polarized bit channels, a number of bits of the at least one repeated bit of the information bit vector, or bit channel reliability information for the first and second sets of polarized bit channels.

In Example 7, the second set of parity check bits of any of Examples 1-6 includes a plurality of parity check bits including parity check information for a subset of the at least one repeated bit of the information bit vector.

In Example 8, calculated values corresponding to each of the plurality of parity check bits of any of Examples 1-7 include a same bit value.

In Example 9, calculated values corresponding to each of the plurality of parity check bits of any of Examples 1-7 may be determined based at least in part on a function of an index of the each of the plurality of parity check bits within the plurality of parity check bits.

In Example 10, at least one parity check bit of the second set of parity check bits including parity check information for a subset of the at least one repeated bit of the information bit vector of any of Examples 1-9 may be mapped to a bit channel of the second set of polarized bit channels that may be located prior to at least one bit channel corresponding to the subset of the at least one repeated bit of the information bit vector.

Example 11 is a system or apparatus including means for implementing a method or realizing an apparatus as in any of examples 1-10.

Example 12 is a system including one or more processors and memory in electronic communication with the one or more processors storing instructions executable by the one or more processors to cause the system or apparatus to implement a method as in any of examples 1-10.

Example 13 is a non-transitory computer-readable medium storing instructions executable by one or more processors to cause the one or more processors to implement a method as in any of examples 1-10.

Example 14 is a method of wireless communication that includes determining a first set of parity check bits based at least in part on an information bit vector, generating a first set of encoded bits by mapping the information bit vector to a first set of polarized bit channels of a first polar code according to a first bit index set and mapping the first set of parity check bits to other bit channels of the first set of polarized bit channels, and transmitting the first set of encoded bits to a device over a wireless channel. The method of Example 14 further includes receiving, from the device, an indication that a first decoding operation performed on the first set of encoded bits was unsuccessful, determining a second set of parity check bits based at least in part on at least one bit of the information bit vector, and generating a second set of encoded bits by mapping the second set of parity check bits to bit channels of a second set of polarized bit channels of a second polar code, where the second polar code is a superset of the first polar code. The method of Example 14 further includes transmitting the second set of encoded bits to the device over the wireless channel and communicating with the device based at least in part on a result of a second decoding operation performed on the first set of encoded bits and the second set of encoded bits.

In Example 15, the second set of encoded bits of Example 14 is generated by mapping a repetition of the at least on bit of the information bit vector to the second set of polarized bit channels of the second polar code according to a second bit index set and mapping the second set of parity check bits to other bit channels of the second set of polarized bit channels.

In Example 16, the communicating with the device of Example 14 includes receiving, from the device, a second indication that the second decoding operation was successful.

In Example 17, the communicating with the device of Example 14 includes receiving, from the device, a second indication that the second decoding operation was unsuccessful.

In Example 18, the method of any of Examples 14-17 further includes determining a number of bits for the second set of parity check bits based at least in part on one or more of a number of bits in the information bit vector, a number of bit channels in the first set of polarized bit channels, a number of bits of the at least one bit of the information bit vector for repetition, or a number of bits of the first set of parity check bits.

In Example 19, the method of any of Examples 14-18 further includes determining the other bit channels of the second set of polarized bit channels for the second set of parity check bits based at least in part on one or more of a number of bits in the information bit vector, a number of bit channels in the first set of polarized bit channels, a number of bits of the at least one bit of the information bit vector for repetition, or bit channel reliability information for the first and second sets of polarized bit channels.

In Example 20, the second set of parity check bits of any of Examples 14-19 includes a plurality of parity check bits including parity check information for a subset of the at least one bit of the information bit vector for repetition.

In Example 21, the method of any of Examples 14-20 further includes calculating a same bit value corresponding to each of the plurality of parity check bits.

In Example 22, the method of any of Examples 14-20 further includes calculating values corresponding to each of the plurality of parity check bits based at least in part on a function of an index of the each of the plurality of parity check bits within the plurality of parity check bits.

In Example 23, the method of any of Examples 14-22 further includes mapping at least one parity check bit of the second set of parity check bits including parity check information for a subset of the at least one bit of the information bit vector for repetition to a bit channel of the second set of polarized bit channels that may be located prior to at least one bit channel corresponding to the subset of the at least one bit of the information bit vector for repetition.

In Example 24, the method of any of Examples 14-23 further includes performing rate matching on one or both of the first set of encoded bits or the second set of encoded bits, where one or both of the transmitting the first set of encoded bits or the transmitting the second set of encoded bits may be based at least in part on the rate matching.

Example 25 is a system or apparatus including means for implementing a method or realizing an apparatus as in any of examples 14-24.

Example 26 is a system including one or more processors and memory in electronic communication with the one or more processors storing instructions executable by the one or more processors to cause the system or apparatus to implement a method as in any of examples 14-24.

Example 27 is a non-transitory computer-readable medium storing instructions executable by one or more processors to cause the one or more processors to implement a method as in any of examples 14-24.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
 receiving a first set of encoded bits from a device over a wireless channel;
 performing a first decoding operation on the first set of encoded bits according to a first polar code to obtain a first representation of an information bit vector determined from a first set of polarized bit channels of the first polar code according to a first bit index set and a first set of parity check bits for the information bit vector, the first set of parity check bits mapped to each bit channel not corresponding to an information bit and located subsequent to a first information bit channel with a lowest bit index of a plurality of information bit channels for the first set of polarized bit channels;

transmitting, to the device, an indication that the first decoding operation was unsuccessful;
receiving a second set of encoded bits from the device over the wireless channel;
performing a second decoding operation on the first set of encoded bits and the second set of encoded bits according to a second polar code to obtain a second representation of the information bit vector and a second set of parity check bits, wherein the second polar code comprises the first set of polarized bit channels and a second set of polarized bit channels, and the second set of parity check bits is mapped to bit channels of the second set of polarized bit channels; and
communicating with the device based at least in part on a result of the second decoding operation.

2. The method of claim 1, further comprising:
determining that the information bit vector is successfully decoded based at least in part on the second representation of the information bit vector and the second set of parity check bits, wherein the communicating with the device comprises transmitting a second indication to the device that the second decoding operation was successful.

3. The method of claim 1, further comprising:
determining that the second decoding operation was unsuccessful based at least in part on the second representation of the information bit vector and the second set of parity check bits, wherein the communicating with the device comprises transmitting a second indication to the device that the second decoding operation was unsuccessful.

4. The method of claim 1, wherein:
the second representation of the information bit vector comprises a repetition of at least one bit of the information bit vector to a second bit index set of the second set of polarized bit channels; and
the second set of parity check bits comprises parity check information for the at least one repeated bit of the information bit vector.

5. The method of claim 4, further comprising:
determining a quantity of bits for the second set of parity check bits based at least in part on one or more of a quantity of bits in the information bit vector, a quantity of bit channels in the first set of polarized bit channels, a quantity of bits of the at least one repeated bit of the information bit vector, or a quantity of bits of the first set of parity check bits.

6. The method of claim 4, further comprising:
determining the bit channels for the second set of parity check bits based at least in part on one or more of a quantity of bits in the information bit vector, a quantity of bit channels in the first set of polarized bit channels, a quantity of bits of the at least one repeated bit of the information bit vector, or bit channel reliability information for the first set of polarized bit channels and the second set of polarized bit channels.

7. The method of claim 4, wherein the second set of parity check bits comprises a plurality of parity check bits comprising parity check information for a subset of the at least one repeated bit of the information bit vector.

8. The method of claim 7, wherein calculated values corresponding to each of the plurality of parity check bits comprise a same bit value.

9. A method for wireless communication, comprising:
receiving a first set of encoded bits from a device over a wireless channel;
performing a first decoding operation on the first set of encoded bits according to a first polar code to obtain a first representation of an information bit vector determined from a first set of polarized bit channels of the first polar code according to a first bit index set and a first set of parity check bits for the information bit vector;
transmitting, to the device, an indication that the first decoding operation was unsuccessful;
receiving a second set of encoded bits from the device over the wireless channel;
performing a second decoding operation on the first set of encoded bits and the second set of encoded bits according to a second polar code to obtain a second representation of the information bit vector and a second set of parity check bits, wherein the second polar code comprises the first set of polarized bit channels and a second set of polarized bit channels, the second representation of the information bit vector comprises a repetition of at least one bit of the information bit vector to a second bit index set of the second set of polarized bit channels, and the second set of parity check bits is mapped to bit channels of the second set of polarized bit channels and comprises a plurality of parity check bits comprising parity check information for the at least one repeated bit of the information bit vector, wherein calculated values corresponding to each of the plurality of parity check bits are determined based at least in part on a function of an index of the each of the plurality of parity check bits within the plurality of parity check bits; and
communicating with the device based at least in part on a result of the second decoding operation.

10. The method of claim 4, wherein at least one parity check bit of the second set of parity check bits comprising parity check information for a subset of the at least one repeated bit of the information bit vector is mapped to a bit channel of the second set of polarized bit channels that is located prior to at least one bit channel corresponding to the subset of the at least one repeated bit of the information bit vector.

11. A method for wireless communication, comprising:
determining a first set of parity check bits based at least in part on an information bit vector;
generating a first set of encoded bits by mapping the information bit vector to a first set of polarized bit channels of a first polar code according to a first bit index set and mapping the first set of parity check bits to each bit channel not corresponding to an information bit and located subsequent to a first information bit channel with a lowest bit index of a plurality of information bits channels for the first set of polarized bit channels;
transmitting the first set of encoded bits to a device over a wireless channel;
receiving, from the device, an indication that a first decoding operation performed on the first set of encoded bits was unsuccessful;
determining a second set of parity check bits based at least in part on at least one bit of the information bit vector;
generating a second set of encoded bits by mapping the second set of parity check bits to bit channels of a second set of polarized bit channels of a second polar code, wherein the second polar code is a superset of the first polar code;
transmitting the second set of encoded bits to the device over the wireless channel; and communicating with the device based at least in part on a result of a second decoding operation performed on the first set of encoded bits and the second set of encoded bits.

12. The method of claim 11, wherein the second set of encoded bits is generated by mapping a repetition of the at least one bit of the information bit vector to the second set of polarized bit channels of the second polar code according to a second bit index set and mapping the second set of parity check bits to other bit channels of the second set of polarized bit channels.

13. The method of claim 11, wherein the communicating with the device comprises receiving, from the device, a second indication that the second decoding operation was successful.

14. The method of claim 11, wherein the communicating with the device comprises receiving, from the device, a second indication that the second decoding operation was unsuccessful.

15. The method of claim 11, further comprising:
determining a quantity of bits for the second set of parity check bits based at least in part on one or more of a quantity of bits in the information bit vector, a quantity of bit channels in the first set of polarized bit channels, a quantity of bits of the at least one bit of the information bit vector, or a quantity of bits of the first set of parity check bits.

16. The method of claim 11, further comprising:
determining the bit channels of the second set of polarized bit channels for the second set of parity check bits based at least in part on one or more of a quantity of bits in the information bit vector, a quantity of bit channels in the first set of polarized bit channels, a quantity of bits of the at least one bit of the information bit vector, or bit channel reliability information for the first set of polarized bit channels and the second set of polarized bit channels.

17. The method of claim 11, wherein the second set of parity check bits comprises a plurality of parity check bits comprising parity check information for a subset of the at least one bit of the information bit vector.

18. The method of claim 17, further comprising:
calculating a same bit value corresponding to each of the plurality of parity check bits.

19. A method for wireless communication, comprising:
determining a first set of parity check bits based at least in part on an information bit vector;
generating a first set of encoded bits by mapping the information bit vector to a first set of polarized bit channels of a first polar code according to a first bit index set and mapping the first set of parity check bits to other bit channels of the first set of polarized bit channels;
transmitting the first set of encoded bits to a device over a wireless channel;
receiving, from the device, an indication that a first decoding operation performed on the first set of encoded bits was unsuccessful;
calculating values corresponding to each of a plurality of parity check bits based at least in part on a function of an index of the each of the plurality of parity check bits within the plurality of parity check bits and at least one bit of the information bit vector;
determining a second set of parity check bits based at least in part on the calculated values, wherein the second set of parity check bits comprises the plurality of parity check bits comprising parity check information for a subset of the at least one bit of the information bit vector;
generating a second set of encoded bits by mapping the second set of parity check bits to bit channels of a second set of polarized bit channels of a second polar code, wherein the second polar code is a superset of the first polar code;
transmitting the second set of encoded bits to the device over the wireless channel; and
communicating with the device based at least in part on a result of a second decoding operation performed on the first set of encoded bits and the second set of encoded bits.

20. The method of claim 11, further comprising:
mapping at least one parity check bit of the second set of parity check bits comprising parity check information for a subset of the at least one bit of the information bit vector to a bit channel of the second set of polarized bit channels that is located prior to at least one bit channel corresponding to the subset of the at least one bit of the information bit vector.

21. The method of claim 11, further comprising:
performing rate matching on one or both of the first set of encoded bits or the second set of encoded bits, wherein one or both of the transmitting the first set of encoded bits or the transmitting the second set of encoded bits is based at least in part on the rate matching.

22. An apparatus for wireless communication, comprising:
a processor;
memory in electronic communication with the processor; and
instructions stored in the memory and executable by the processor to cause the apparatus to:
receive a first set of encoded bits from a device over a wireless channel;
perform a first decoding operation on the first set of encoded bits according to a first polar code to obtain a first representation of an information bit vector determined from a first set of polarized bit channels of the first polar code according to a first bit index set and a first set of parity check bits for the information bit vector, the first set of parity check bits mapped to each bit channel not corresponding to an information bit and located subsequent to a first information bit channel with a lowest bit index of a plurality of information bit channels for the first set of polarized bit channels;
transmit, to the device, an indication that the first decoding operation was unsuccessful;
receive a second set of encoded bits from the device over the wireless channel;
perform a second decoding operation on the first set of encoded bits and the second set of encoded bits according to a second polar code to obtain a second representation of the information bit vector and a second set of parity check bits, wherein the second polar code comprises the first set of polarized bit channels and a second set of polarized bit channels, and the second set of parity check bits is mapped to bit channels of the second set of polarized bit channels; and
communicate with the device based at least in part on a result of the second decoding operation.

23. The apparatus of claim 22, wherein the instructions are further executable by the processor to cause the apparatus to:
    determine that the information bit vector is successfully decoded based at least in part on the second representation of the information bit vector and the second set of parity check bits, wherein the communicating with the device comprises transmitting a second indication to the device that the second decoding operation was successful.

24. The apparatus of claim 22, wherein the instructions are further executable by the processor to cause the apparatus to:
    determine that the second decoding operation was unsuccessful based at least in part on the second representation of the information bit vector and the second set of parity check bits, wherein the communicating with the device comprises transmitting a second indication to the device that the second decoding operation was unsuccessful.

25. The apparatus of claim 22, wherein:
    the second representation of the information bit vector comprises a repetition of at least one bit of the information bit vector to a second bit index set of the second set of polarized bit channels; and
    the second set of parity check bits comprises parity check information for the at least one repeated bit of the information bit vector.

26. The apparatus of claim 25, wherein the instructions are further executable by the processor to cause the apparatus to:
    determine a quantity of bits for the second set of parity check bits based at least in part on one or more of a quantity of bits in the information bit vector, a quantity of bit channels in the first set of polarized bit channels, a quantity of bits of the at least one repeated bit of the information bit vector, or a quantity of bits of the first set of parity check bits.

27. An apparatus for wireless communication, comprising:
    a processor;
    memory in electronic communication with the processor; and
    instructions stored in the memory and executable by the processor to cause the apparatus to:
        determine a first set of parity check bits based at least in part on an information bit vector;
        generate a first set of encoded bits by mapping the information bit vector to a first set of polarized bit channels of a first polar code according to a first bit index set and mapping the first set of parity check bits to each bit channel not corresponding to an information bit and located subsequent to a first information bit channel with a lowest bit index of a plurality of information bits channels for the first set of polarized bit channels;
        transmit the first set of encoded bits to a device over a wireless channel;
        receive, from the device, an indication that a first decoding operation performed on the first set of encoded bits was unsuccessful;
        determine a second set of parity check bits based at least in part on at least one bit of the information bit vector;
        generate a second set of encoded bits by mapping the second set of parity check bits to bit channels of a second set of polarized bit channels of a second polar code, wherein the second polar code is a superset of the first polar code;
        transmit the second set of encoded bits to the device over the wireless channel; and
        communicate with the device based at least in part on a result of a second decoding operation performed on the first set of encoded bits and the second set of encoded bits.

28. The apparatus of claim 27, wherein the second set of encoded bits is generated by mapping a repetition of the at least one bit of the information bit vector to the second set of polarized bit channels of the second polar code according to a second bit index set and mapping the second set of parity check bits to other bit channels of the second set of polarized bit channels.

29. The apparatus of claim 27, wherein the instructions are further executable by the processor to cause the apparatus to:
    determine a quantity of bits for the second set of parity check bits based at least in part on one or more of a quantity of bits in the information bit vector, a quantity of bit channels in the first set of polarized bit channels, a quantity of bits of the at least one bit of the information bit vector, or a quantity of bits of the first set of parity check bits.

30. The apparatus of claim 27, wherein the instructions are further executable by the processor to cause the apparatus to:
    determine the bit channels of the second set of polarized bit channels for the second set of parity check bits based at least in part on one or more of a quantity of bits in the information bit vector, a quantity of bit channels in the first set of polarized bit channels, a quantity of bits of the at least one bit of the information bit vector, or bit channel reliability information for the first set of polarized bit channels and the second set of polarized bit channels.

* * * * *